US012764571B2

(12) United States Patent
Shah et al.

(10) Patent No.: US 12,764,571 B2
(45) Date of Patent: Oct. 13, 2026

(54) COLLECTING CLIENT DATA FOR WIRELESS CLIENT DEVICES

(71) Applicant: Juniper Networks, Inc., Sunnyvale, CA (US)

(72) Inventors: Kush Shah, Santa Clara, CA (US); Elpidio Hilario Dela Cruz, San Jose, CA (US); Sunalini Sankhavaram, Saratoga, CA (US); David Luu, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 605 days.

(21) Appl. No.: 17/937,347

(22) Filed: Sep. 30, 2022

(65) Prior Publication Data

US 2023/0126313 A1 Apr. 27, 2023

Related U.S. Application Data

(60) Provisional application No. 63/261,939, filed on Sep. 30, 2021.

(51) Int. Cl.
*H04W 24/08* (2009.01)
*H04W 88/08* (2009.01)

(52) U.S. Cl.
CPC .......... *H04W 24/08* (2013.01); *H04W 88/08* (2013.01)

(58) Field of Classification Search
CPC ..... H04W 24/08; H04W 88/08; H04W 24/04; H04W 24/02
See application file for complete search history.

(56) References Cited

U.S. PATENT DOCUMENTS 9,729,439 B2 8/2017 MeLampy et al.
9,729,682 B2 8/2017 Kumar et al.
(Continued)

FOREIGN PATENT DOCUMENTS

EP 3700133 A1 8/2020
WO 2017003780 A1 1/2017

OTHER PUBLICATIONS

Cisco. (Aug. 10, 2018). Network Management System: Best practices white paper—cisco. https://www.cisco.com/c/en/us/support/docs/availability/high-availability/15114-NMS-bestpractice.html (Year: 2018).*
(Continued)

*Primary Examiner* — Thomas R Cairns
*Assistant Examiner* — Raenita Ann Fenner
(74) *Attorney, Agent, or Firm* — Shumaker & Sieffert P.A.

(57) ABSTRACT

This disclosure describes a system including a plurality of access point (AP) devices configured to provide a wireless network at a site; and a network management system (NMS) including a memory storing AP-side data collected by the plurality of AP devices and storing client-side data collected by a plurality of client devices connected to one or more of the AP devices to access the wireless network. The NMS is configured to correlate the client-side data for a particular client device of the plurality of client devices with a device identifier of the particular client device; associate, based on the device identifier, the client-side data for the particular client device and the AP-side data for the particular client device; analyze the client-side data and the associated AP-side data for the particular client device to detect a wireless issue; and output a notification including an indication of the wireless issue.

19 Claims, 21 Drawing Sheets

(56) References Cited

U.S. PATENT DOCUMENTS

| | | | | |
|---|---|---|---|---|
| 9,762,485 | B2 | 9/2017 | Kaplan et al. | |
| 9,832,082 | B2 | 11/2017 | Dade et al. | |
| 9,871,748 | B2 | 1/2018 | Gosselin et al. | |
| 9,985,883 | B2 | 5/2018 | MeLampy et al. | |
| 10,200,264 | B2 | 2/2019 | Menon et al. | |
| 10,277,506 | B2 | 4/2019 | Timmons et al. | |
| 10,432,522 | B2 | 10/2019 | Kaplan et al. | |
| 10,756,983 | B2 | 8/2020 | Ratkovic et al. | |
| 10,862,742 | B2 | 12/2020 | Singh | |
| 10,958,537 | B2 | 3/2021 | Safavi | |
| 10,958,585 | B2 | 3/2021 | Safavi | |
| 10,985,969 | B2 | 4/2021 | Safavi et al. | |
| 10,992,543 | B1 | 4/2021 | Rachamadugu et al. | |
| 11,494,255 | B2 | 11/2022 | Wang | |
| 2007/0030857 | A1 * | 2/2007 | Fulknier | H04W 76/15 370/463 |
| 2014/0254416 | A1 * | 9/2014 | Futaki | H04W 76/27 370/252 |
| 2015/0113132 | A1 | 4/2015 | Srinivas et al. | |
| 2016/0212695 | A1 * | 7/2016 | Lynch | H04W 28/0268 |
| 2016/0226731 | A1 * | 8/2016 | Maroulis | H04L 69/40 |
| 2018/0091873 | A1 | 3/2018 | Navin et al. | |
| 2018/0124629 | A1 * | 5/2018 | Wang | H04L 43/04 |
| 2018/0262533 | A1 * | 9/2018 | McCaig | H04L 63/20 |
| 2019/0297122 | A1 | 9/2019 | Harrison | |
| 2019/0356553 | A1 | 11/2019 | Mermoud et al. | |
| 2019/0372857 | A1 | 12/2019 | Gandhi et al. | |
| 2020/0015187 | A1 * | 1/2020 | Hassan | G01S 5/0027 |
| 2020/0322826 | A1 | 10/2020 | Wangler et al. | |
| 2020/0403890 | A1 | 12/2020 | McCulley et al. | |
| 2021/0152990 | A1 | 5/2021 | Pajovic et al. | |
| 2021/0195443 | A1 | 6/2021 | Agarwal et al. | |
| 2021/0226867 | A1 | 7/2021 | Ovadia et al. | |
| 2021/0306201 | A1 | 9/2021 | Wang et al. | |
| 2022/0200954 | A1 | 6/2022 | Divekar et al. | |
| 2022/0337495 | A1 | 10/2022 | Safavi | |
| 2022/0386219 | A1 | 12/2022 | Akl et al. | |
| 2022/0400123 | A1 | 12/2022 | Ayoub et al. | |

OTHER PUBLICATIONS

7Signal, “7Signal Launches Enhanced Wireless Monitoring Application”, Aug. 24, 2020, 3 pp., Retrieved from the Internet on Feb. 28, 2023 from URL: https://www.7signal.com/news/press/7signal-launches-enhanced-wireless-monitoring-application.

7Signal, “A New IDC White Paper Quantifies the ROI of 7Signal”, Jan. 5, 2021, 3 pp., Retrieved from the Internet on Feb. 28, 2023 from URL: https://www.7signal.com/news/blog/a-new-idc-white-paper-quantifies-the-roi-of-7signal-solutions.

International Search Report and Written Opinion of International Application No. PCT/US2022/077431 dated Feb. 6, 2023, 12 pp.

Juniper, “Marvis Android Client”, Juniper driven by Mist AI, Juniper Networks, Inc., 2 pp., Retrieved from the Internet on Sep. 1, 2021 from URL: https://www.mist.com/documentation/category/marvis-android-client/.

Juniper, “Marvis Client—Why do I need it?”, Juniper Networks, Inc., 2021, 4 pp., Retrieved from the Internet on Jul. 30, 2021 from URL: https://www.mist.com/documentation/marvis-client-faq/.

Juniper, “Marvis Clients View: Why do we need a Marvis Clients Page?”, Juniper driven by Mist AI, Juniper Networks, Inc., 2023, 3 pp., Retrieved from the Internet on Jan. 4, 2023 from URL: https://www.mist.com/documentation/marvis-clients-view/.

Juniper, “Zebra Wireless Insights”, Juniper driven by Mist AI, Juniper Networks, Inc., 2023, 5 pp., Retrieved from the Internet on Jan. 4, 2023 from URL: https://www.mist.com/documentation/zebra-worry-free-wi-fi-wfw-integration/.

U.S. Appl. No. 17/652,787, filed February, naming inventors Wang et al.

U.S. Appl. No. 17/935,704, filed Sep. 27, 2022, naming inventors Wang et al.

Response to Communication Pursuant to Rules 161(1) and 162 EPC dated May 8, 2024, from counterpart European Application No. 22803139.9, filed Nov. 5, 2024, 29 pp.

* cited by examiner

COLLECTING CLIENT DATA FOR WIRELESS CLIENT DEVICES

This application claims the benefit of U.S. Provisional Patent Application No. 63/261,939, filed 30 Sep. 2021, the entire content of which is incorporated herein by reference.

The disclosure relates generally to computer networks and, more specifically, to monitoring and control of wireless network performance.

BACKGROUND

Commercial premises, such as offices, hospitals, airports, stadiums, or retail outlets, often include a network of wireless access points (APs) installed throughout the premises to provide wireless network services to one or more wireless devices. APs enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point to access a wired network. As the client devices move throughout the premises, they may automatically switch or "roam" from one wireless access point to another, in-range wireless access point, to provide the users with seamless network connectivity throughout the premises.

SUMMARY

In general, this disclosure describes techniques for a network management system (NMS) to receive and analyze client device data. The client device data may be received from a third party service that collects client device data, and/or from a client-based software agent of the NMS, which may run on the client device as part of a software development kit (SDK), for example. The NMS agent enables wireless client devices, such as mobile devices, to send network information to the NMS, e.g., when enabled by an end user of a client device. The NMS agent provides complete network data from the client device's perspective and can help the NMS troubleshoot client-specific network connectivity issues. In some examples, the NMS agent can be run either in a stand-alone mode, or integrated with location services such that the client-based NMS agent sends location data along with the network information.

An NMS agent resides on client devices and provides telemetry data to a cloud-based NMS from the perspective of the client devices. The NMS agent allows the NMS to receive telemetry data related to the client device experience from the client devices' perspectives, in addition to data already received by the NMS from the perspective of an access point through which the client device connects to the NMS. The NMS agent may also provide device properties of the client device to the NMS, including operating system version, modem firmware and software versions, application version running the SDK, and the like. The NMS may use artificial intelligence functionality to analyze the received data, identify WiFi connectivity issues, e.g., roaming issues or WiFi vs cellular, with certain types, versions, or locations of client devices, and generate an action recommending a mitigation action.

In some examples, the NMS receives telemetry data from the NMS agent on a particular client device, correlates the received telemetry data with a client device identifier, associates the client-side telemetry data with client device location data and other AP-side telemetry data based on the client device identifier, analyzes the client-side telemetry data with respect to the associated AP-side telemetry data to detect a connectivity problem, and generates a notification of the connectivity problem. For example, the notification of the connectivity problem may indicate a device issue (WiFi vs cellular, or device type/version) or a network issue (device location). In this manner, the NMS can determine a manner in which the data from the APs and/or UEs is correlated, or determine whether a connectivity problem or connectivity degradation is a device issue or a network issue.

For example, the NMS may obtain client device identification data (e.g., a client device MAC address) from the connected AP to correlate the client telemetry data with the client device identifier at the NMS. The NMS may also combine the NMS agent client SDK data with location SDK data.

The techniques described in this disclosure may provide one or more technical advantages and practical applications. For example, obtaining client-side data and AP-side data about a client device may enable more accurate client device location-based issue determination and finding lost client devices. The techniques may allow an NMS to determine whether a wireless issue such as a connectivity problem or connectivity degradation is a client device issue or a network issue.

In one example, this disclosure describes a system that includes a plurality of access point (AP) devices configured to provide a wireless network at a site; and a network management system (NMS) that includes a memory storing AP-side data collected by the plurality of AP devices and storing client-side data collected by a plurality of client devices connected to one or more of the AP devices to access the wireless network; and one or more processors coupled to the memory and configured to: correlate the client-side data for a particular client device of the plurality of client devices with a device identifier of the particular client device; associate, based on the device identifier, the client-side data for the particular client device and the AP-side data for the particular client device; analyze the client-side data in addition to the associated AP-side data for the particular client device to detect a wireless issue; and output a notification including an indication of the wireless issue.

In another example, this disclosure describes a method that includes receiving, by a network management system, access point (AP)-side data collected by plurality of AP devices configured to provide a wireless network at a site; receiving, by the network management system, client-side data collected by a plurality of client devices connected to one or more of the AP devices to access the wireless network; correlating the client-side data for a particular client device of the plurality of client devices with a device identifier of the particular client device; associating, based on the device identifier, the client-side data for the particular client device and the AP-side data for the particular client device; analyzing the client-side data in addition to the associated AP-side data for the particular client device to detect a wireless issue; and outputting a notification including an indication of the wireless issue.

In another example, this disclosure describes a network management system that manages a plurality of network devices in a network, the network management system including one or more processors; and a memory storing: access point (AP)-side data collected by plurality of AP devices configured to provide a wireless network at a site, and storing client-side data collected by a plurality of client devices connected to one or more of the AP devices to access the wireless network includes correlate the client-side data for a particular client device of the plurality of client devices with a device identifier of the particular client device; associate, based on the device identifier, the client-side data for the particular client device and the AP-side data for the particular client device; analyze the client-side data in addition to the associated AP-side data for the particular client device to detect a wireless issue; and output a notification including an indication of the wireless issue.

In a further example, a method includes receiving, by a network management system, client-side data collected by a plurality of client devices connected to one or more access point (AP) devices to access a wireless network provided by the AP devices; analyzing, by the network management system, client-side data for a particular client device of the plurality of client devices to detect a client event; and outputting, by the network management system, a notification including an indication of the client event.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
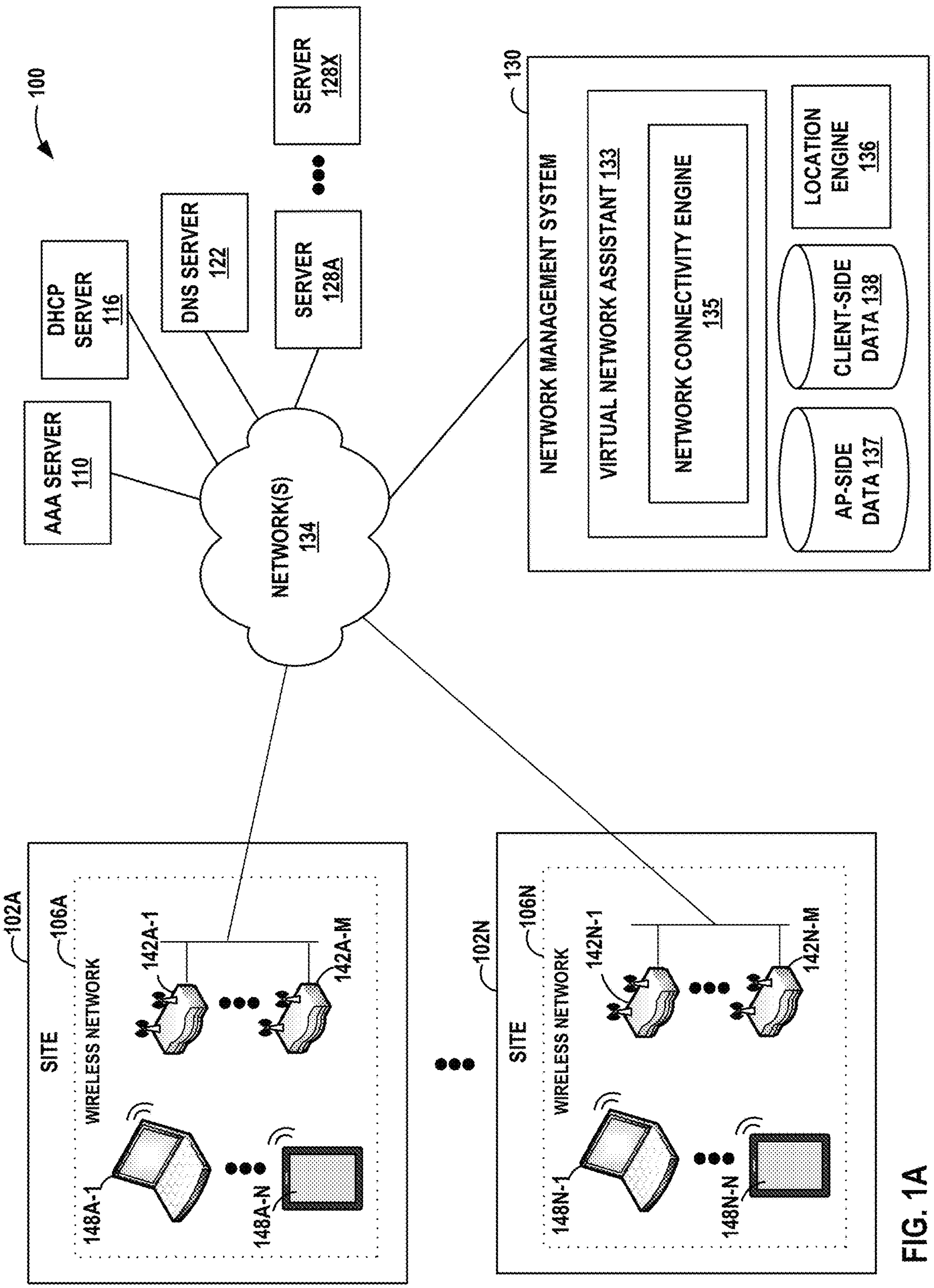
FIG. 1A is a diagram of an example network system 100 that enables a network management system to obtain and analyze client-side data about client devices, in accordance with one or more techniques of the disclosure.

FIG. 1A is a diagram of an example network system 100 that enables a network management system to obtain and analyze client-side data about client devices, in accordance with one or more techniques of the disclosure. In some examples, the network management system also obtains and analyzes AP-side data about the client devices. Example network system 100, such as a network system for an organization or enterprise, includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Sites 102, such as offices, hospitals, airports, stadiums, or retail outlets, often install complex wireless network systems, including a network of wireless access point (AP) devices, e.g., AP devices 142, throughout the premises to provide wireless network services to one or more wireless client devices. In this example, site 102A includes a plurality of AP devices 142A-1 through 142A-M. Similarly, site 102N includes a plurality of AP devices 142N-1 through 142N-M. Each AP device 142 may be any type of wireless access point, including, but not limited to, a commercial or enterprise access point, a router, or any other device capable of providing wireless network access. Although the example of FIG. 1A is described with respect to wireless network systems, the techniques described in this disclosure may apply to wired network systems and/or wireless network systems.

Each site 102A-102N also includes a plurality of client devices, otherwise known as user equipment devices (UEs), referred to generally as client devices 148 or UEs 148, representing various wireless-enabled devices within each site. For example, a plurality of UEs 148A-1 through 148A-N are currently located at site 102A. Similarly, a plurality of UEs 148N-1 through 148N-N are currently located at site 102N. Each UE 148 may be any type of wireless client device, including, but not limited to, a mobile device such as a smartphone, tablet or laptop computer, a personal digital assistant (PDA), a wireless terminal, a smart watch, smart ring or other wearable device. UEs 148 may also include IoT client devices such as printers, security devices, environmental sensors, appliances, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), and a network management system (NMS) 130. As shown in FIG. 1A, the various devices and systems of network 100 are coupled together via one or more network(s) 134, e.g., the Internet and/or an enterprise intranet. Each one of the servers 110, 116, 122 and/or 128, AP devices 142, UEs 148, NMS 130, and any other servers or devices attached to or forming part of network system 100 may include a system log or an error log module wherein each one of these devices records the status of the device including normal operational status and error conditions.

In the example of FIG. 1A, NMS 130 is a cloud-based computing platform that manages wireless networks 106A-106N at one or more of sites 102A-102N. As further described herein, NMS 130 provides an integrated suite of wireless network management tools and implements various techniques of the disclosure.

NMS 130 monitors network data associated with wireless networks 106A-106N at each site 102A-102N, respectively, to deliver a high-quality wireless network experience to end users, IoT devices and clients at the site. The network data may be stored in a database, such as database 137 within NMS 130 or, alternatively, in an external database. In general, NMS 130 may provide a cloud-based platform for network data acquisition, monitoring, activity logging, reporting, predictive analytics, network anomaly identification, and alert generation.

NMS 130 observes, collects and/or receives network data 137 for a variety of client devices, such as SDK clients, named assets, and/or client devices connected/unconnected to the wireless network. The network data is indicative of one or more aspects of wireless network performance. Network data 137 may take the form of data extracted from messages, counters and statistics, for example. The network data may be collected and/or measured by one or more UEs 148 and/or one or more AP devices 142 in a wireless network 106. Some of the network data 137 may be collected and/or measured by other devices in the network system 100. In accordance with one specific implementation, a computing device is part of the network management server 130. In accordance with other implementations, NMS 130 may comprise one or more computing devices, dedicated servers, virtual machines, containers, services or other forms of environments for performing the techniques described herein.

NMS 130 may include a virtual network assistant (VNA) 133 that analyzes network data received from one or more UEs 148 and/or one or more AP devices 142 in a wireless network. VNA 133 may provide real-time insights to client devices, to network administrators, to IT personnel, or other entities. In some examples, VNA 133 provides simplified troubleshooting for IT operations. In some examples, VNA 133 automatically takes remedial action and/or provides recommendations to proactively address wireless network issues. VNA 133 may, for example, include a network data processing platform configured to process hundreds or thousands of concurrent streams of network data from UEs 148, sensors and/or agents associated with AP devices 142 and/or nodes within network 134. For example, VNA 133 of NMS 130 may include a network performance engine that automatically determines one or more service level experience (SLE) metrics for each client device 148 in a wireless network 106. SLE metrics determined based on the collected network data can be used to measure various aspects of wireless network performance. SLE metrics seek to measure and understand network performance from the viewpoint of the end user experience on the network.

One example SLE metric is a coverage metric, which tracks the number of user minutes that a client device's received signal strength indicator (RSSI) as measured by the client and conveyed via an access point with which the UE is associated is below a configurable threshold. Another example SLE metric is a roaming metric, which tracks a client's percentage of successful roams between two access points that are within prescribed latency (e.g., time-based) thresholds. Other example SLE metrics may include time to connect, throughput, successful connects, capacity, AP health, and/or any other metric that may be indicative of one or more aspects of wireless network performance. The SLE metrics may also include parameters such as a received signal strength indicator (RSSI) of a received wireless signal as measured by the client device, a signal-to-noise ratio (SNR) of the wireless signal as measured by the client device, etc. The thresholds may be customized and configured by the wireless network service provider to define service level expectations at the site. The network service provider may further implement systems that automatically identify the root cause(s) of any SLE metrics that do not satisfy the thresholds, and/or that automatically implement one or more remedial actions to address the root cause, thus automatically improving wireless network performance.

VNA 133 may also include an underlying analytics and network error identification engine and alerting system. VNA 133 may further provide real-time alerting and reporting to notify administrators or IT personnel of any predicted events, anomalies, trends, and may perform root cause analysis and automated or assisted error remediation.

In some examples, VNA 133 of NMS 130 may apply machine learning techniques to detect network scope failure and identify the root cause of error conditions detected from the streams of event data. VNA 133 may generate a notification indicative of the root cause and/or one or more remedial actions that may be taken to address the root cause of the error conditions. In some examples, if the root cause may be automatically resolved, VNA 133 invokes one or more remedial or mitigating actions to address the root cause of the error condition, thus automatically improving the underlying wireless network performance, and automatically improving the user experience of the wireless network.

Computational resources and components implementing VNA 133 may be part of the NMS 130, may execute on other servers or execution environments, or may be distributed to nodes within network 134 (e.g., routers, switches, controllers, gateways and the like). Example details of these and other operations implemented by the VNA 133 and/or NMS 130 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," all of which are incorporated herein by reference in their entirety.

In accordance with some example aspects of the techniques described in this disclosure, an NMS agent (not shown) runs on UEs 148 and provides telemetry data to NMS 130 from the perspective of UEs 148. The NMS agent allows NMS 130 to receive telemetry data related to the client device experience from the client devices' perspectives. In some examples, the client device data is in addition to data received by NMS 130 from the perspective of an access point through which the client device connects to NMS 130. The NMS agent may also provide device properties of the UE 148 to NMS 130, including operating system (OS) version, modem firmware and software versions, application version running the SDK, and the like. Network connectivity engine 135 of NMS 130 may use artificial intelligence functionality to analyze the received data, identify WiFi connectivity issues, e.g., roaming issues or WiFi vs. cellular, with certain types, versions, or locations of client devices, and generate an action recommending a mitigation action.

In some examples, NMS 130 receives telemetry data from the NMS agent on a particular client device 148, correlates the received telemetry data with a client device identifier, associates the client-side telemetry data with client device location data and other AP-side telemetry data based on the client device identifier, analyzes the client-side telemetry data with respect to the associated AP-side telemetry data to detect a connectivity problem, and generates a notification of the connectivity problem. For example, the notification of the connectivity problem may indicate a device issue (WiFi vs cellular, or device type/version) or a network issue (device location). In this manner, NMS 130 can determine a manner in which the data from the APs 142 and/or UEs 148 is correlated, and/or network connectivity engine 135 can determine whether a connectivity problem or connectivity degradation is a device issue or a network issue.

In some examples, NMS 130 receives client data about multiple client devices, and analyzes the client device data in the aggregate, e.g., to determine trends or common issues across multiple client devices. For example, NMS 130 may identify an issue with a particular software version on the client devices.

In some example aspects, in addition to or instead of receiving telemetry data from UEs 148 via an NMS agent executing on UEs 148, NMS 130 receives "third-party" client data related to the client device experience from the client devices' perspectives. In some example implementations an NMS agent may not run on UEs 148 at all.

In some examples, the NMS agent works with NMS 130 to enable a cloud-based determination of whether connectivity problems (e.g., roaming, jitter, etc.) for certain client devices at a particular site is a client issue or a network issue, and send recommended actions based on client device type or version or site location. In some examples, NMS 130 analyzes only the client data, and provides insights, service level experience (SLE) metrics, and/or recommended actions to the client devices based on the client data. As an example action, NMS 130 may recommend downloading a different software version to avoid a version that has been determined to cause communication or connectivity problems for client devices.

Figure 1B:
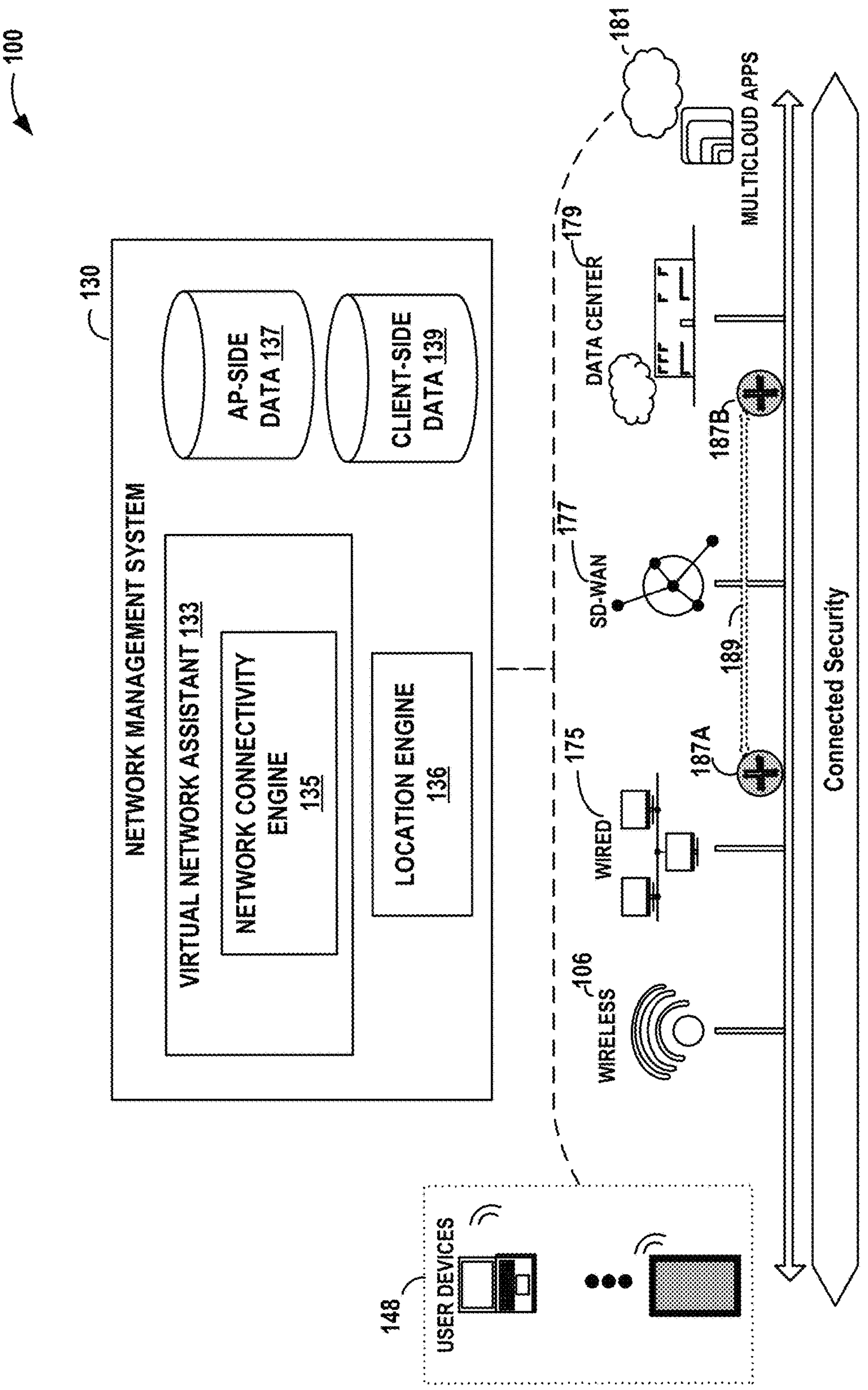
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (WiFi Assurance, Wired Assurance and WAN assurance) spanning from wireless network 106 and wired LAN 175 networks at the network edge (far left of FIG. 1B) to cloud-based application services 181 hosted by computing resources within data centers 179 (far right of FIG. 1B).

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of edge wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 148 to steer traffic along selected paths, e.g., path 189, toward application services 181 without requiring use of tunnels and/or additional labels. In this way, routers 177A, 177B may be more efficient and scalable for large networks since the use of tunnel-less, session-based routing may enable routers 177A, 177B to achieve considerable network resources by obviating the need to perform encapsulation and decapsulation at tunnel endpoints. Moreover, in some examples, each router 177A, 177B may independently perform path selection and traffic engineering to control packet flows associated with each session without requiring use of a centralized SDN controller for path selection and label distribution. In some examples, routers 177A, 177B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur.

Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

For example, NMS 130 may obtain client device identification data (e.g., a client device MAC address) from the connected AP 142 to correlate the client telemetry data with the client device identifier at NMS 130. NMS 130 may also combine the NMS agent client SDK data with location SDK data from location engine 136, such as for more accurate client device location-based issue determination and finding lost client devices.

One problem in obtaining the client device's MAC address may be due to increased privacy features on the client devices 148 that limit the identification information shared with other applications. In accordance with the techniques of this disclosure, the NMS 130 obtains the client device MAC address by collecting network data (e.g., client device on Wi-Fi, client device IP address, connected AP, Wi-Fi network name, etc.), and comparing the client device network data to AP network data to obtain the client device MAC address from the connected AP 142.

It may be challenging to combine the NMS agent SDK data and the location SDK data from location engine 136 when the data is collected separately, by separate SDKs, and used for different purposes. To address this, NMS 130 is configured to use a universally unique identifier (UUID) provided by the client device 148 for location engine 136 as the application running the location SDK, and correlating the location data with other client device data based on the UUID.

In this manner, network system 100 includes a plurality of AP devices 142 configured to provide a wireless network at a site 102; and NMS 130. NMS 130 may include a memory storing AP-side data 137 collected by the plurality of AP devices and storing client-side data 139 collected by a plurality of client devices 148 connected to one or more of the AP devices 142 to access the wireless network 106. NMS 130 further includes one or more processors coupled to the memory and configured to: correlate the client-side data for a particular client device of the plurality of client devices with a device identifier of the particular client device; associate, based on the device identifier, the client-side data for the particular client device and the AP-side data for the particular client device; analyze the client-side data with respect to the associated AP-side data for the particular client device to detect a connectivity issue; and output a notification including an indication of the connectivity issue.

Additionally, in some examples NMS 130 may receive the client-side telemetry data for the particular client device; and determine an identifier for the particular client device from a particular AP device to which the particular client device is connected. Additionally or alternatively, NMS 130 may associate the client-side telemetry data for the particular client device with client-side location data for the particular client device based on an identifier assigned to a location application running on the particular client device. Additionally or alternatively, NMS 130 may, to analyze the client-side data, determine whether the connectivity issue is due to a client device issue or a wireless network issue by first determining whether the particular client device is connected to the wireless network at the site or connected to a cellular network.

Additionally or alternatively, NMS 130 may, to analyze the client-side data, analyze and/or aggregate correlated data for the plurality of client devices; and determine whether client devices of a same type or having a same software version are experiencing similar connectivity issues. Additionally or alternatively, NMS 130 may, to analyze the client-side data, analyze and/or aggregate correlated data for the plurality of client devices; and determine whether client devices within a similar location at the site are experiencing similar connectivity or network issues.

The following are some examples of information that can be provided using the techniques of this disclosure:

1. Detailed Wi-Fi properties: In some examples, the NMS 130 device fingerprinting provides the manufacturer, device type and OS of the device. The NMS client agent furthers this visibility by providing the OS version along with the radio hardware (adapter) and firmware (driver) versions. This not only helps to identify outliers in terms of a device with a different property than the rest, but also helps to pinpoint device generic issues due to (say) an older/newer firmware version.

2. Coverage issues due to asymmetry: In some examples, an AP indicates the RSSI at which it hears a client, and the NMS client agent provides the other half of the conversation i.e., the RSSI at which the client hears the AP. This is helpful in identifying asymmetries in the power level (or mismatch) between the client device and AP resulting in a poor connection.

3. Cellular or Wi-Fi: When installed on smartphones, the NMS client agent enables a user to see if the client device switches between Wi-Fi and cellular, along with the corresponding signal strength for the same.

4. Roaming behavior: Roaming decisions as well as which AP band to connect to is a client device decision. The NMS client agent provides visibility into how the client device makes this decision, i.e., which APs does the client device detect around it, and how strong are they.

5. The client devices' page user interface uniquely focuses on these client devices and presents them both in a historical fashion as well as currently seen (per site). Additionally, with respect to the above client device properties, the user interface indicates the outliers, i.e., client devices not conforming to the properties (e.g., radio firmware version) as seen with other similar clients (same manufacturer, device type).

In some examples, network connectivity engine 135 of VNA 133 may have some integration with one or more third-party systems such as application/service performance monitoring (APM) vendors to retrieve insights data associated with the third-party network devices and/or third-party applications running on client devices to help determine a root cause of the user-impacting network issues. For example, when a user encounters a quality issue of an online application or service, e.g., Microsoft Teams®, it is possible that the service itself, e.g., Teams, or the service provider, e.g., Comcast Cable®, is down or experiencing issues. As discussed above, NMS 130 does not receive, collect, or otherwise have access to the recorded status and other data of the third-party network devices and/or third-party applications running on client devices. Instead, NMS 130 may leverage insights data from third-party APM vendors to perform troubleshooting and determine the root cause of network issues.

NMS 130 may handle the third-party integration in two different ways: on-demand or proactively. For on-demand third-party integration, network connectivity engine 135 may query the third-party APM vendors via API for insights data of online application services and/or service providers in response to a request, such as a request for troubleshooting of a specific application session experiencing issues. For proactive third-party integration, network connectivity engine 135 may proactively query the third-party APM vendors for insights data of online application services and/or service providers to perform monitoring and detection of the online application services and/or service providers.

Details of application session troubleshooting by NMS 130 are described in U.S. application Ser. No. 17/935,704, entitled "APPLICATION SESSION-SPECIFIC NETWORK TOPOLOGY GENERATION FOR TROUBLESHOOTING THE APPLICATION SESSION," filed Sep. 27, 2022, the entire contents of which are incorporated by reference herein.

Figure 2:
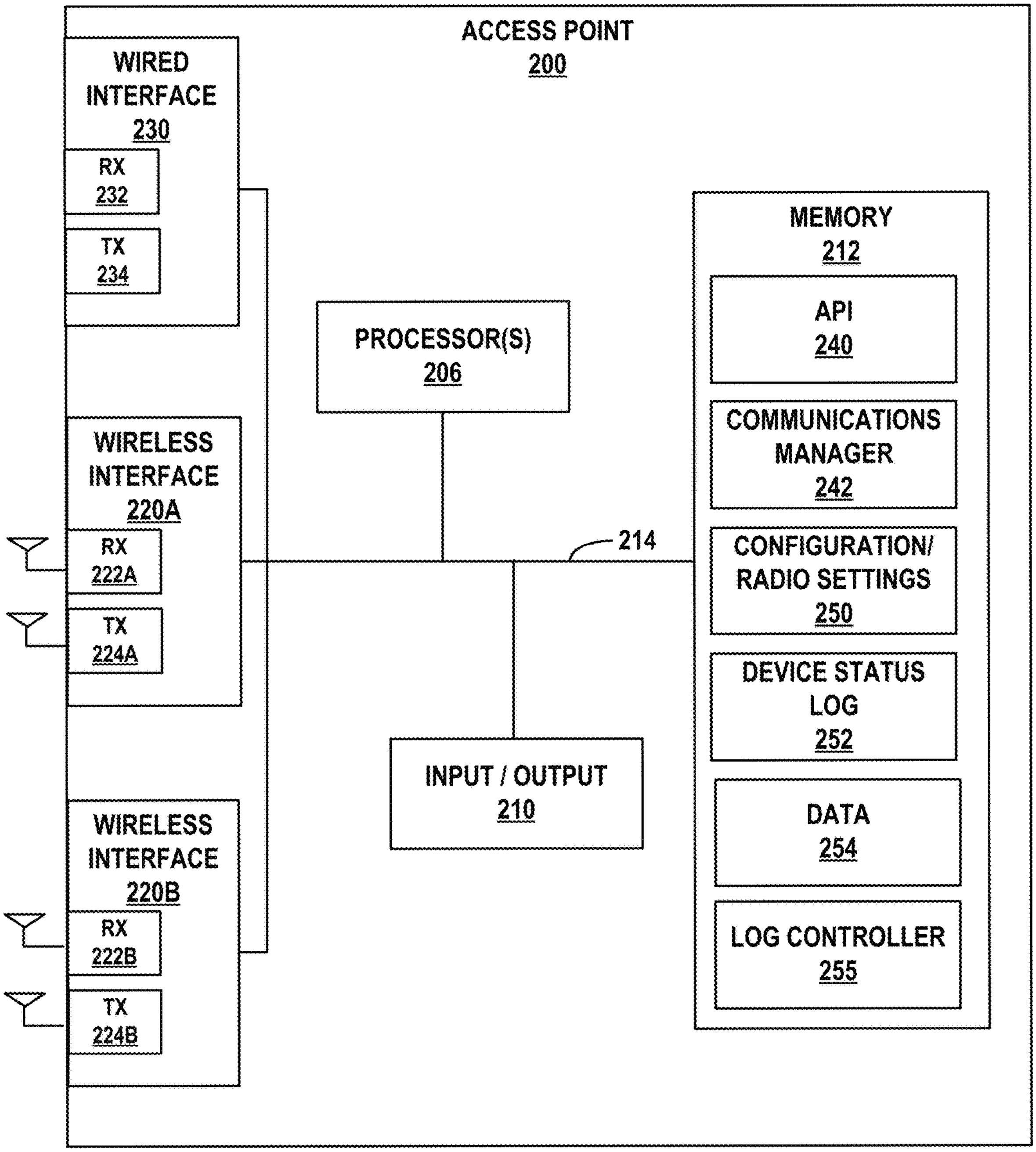
FIG. 2 is a block diagram of an example access point device in accordance with one or more techniques of the disclosure.

FIG. 2 is a block diagram of an example access point (AP) device 200 configured in accordance with one or more techniques of the disclosure. Example access point 200 shown in FIG. 2 may be used to implement any of AP devices 142 as shown and described herein with respect to FIG. 1A. Access point device 200 may comprise, for example, a Wi-Fi, Bluetooth and/or Bluetooth Low Energy (BLE) base station or any other type of wireless access point.

In the example of FIG. 2, access point device 200 includes a wired interface 230, wireless interfaces 220A-220B, one or more processor(s) 206, memory 212, and a user interface 210, coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point device 200 to network(s) 134 of FIG. 1A. First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1A. First and second wireless interfaces 220A and 220B further include transmitters 224A and 224B, respectively, each including transmit antennas via which access point 200 may transmit wireless signals to wireless communications devices, such as UEs 148 of FIG. 1A. In some examples, first wireless interface 220A may include a Wi-Fi 802.11 interface (e.g., 2.4 GHz and/or 5 GHz) and second wireless interface 220B may include a Bluetooth interface and/or a Bluetooth Low Energy (BLE) interface. However, these are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors 206 to perform one or more of the techniques described herein.

Memory 212 includes one or more devices configured to store programming modules and/or data associated with operation of access point device 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software including an application programming interface (API) 240, a communications manager 242, configuration settings 250, a device status log 252 and data storage 254. Device status log 252 includes network data, e.g., a list of network parameters and/or network events, specific to AP device 200 and/or client devices currently or previously associated with AP device 200. The network data may include, for example, any network parameter and/or network data indicative of one or more aspects of performance of the wireless network or of the AP device 200 itself. In some examples, the network data may include a plurality of states measured periodically as time series data. The network data may be measured by the UE devices 148 and transmitted to AP device 200, may be measured by AP device 200 itself or by any other device associated with the wireless network and transmitted to AP device 200.

Network data stored in data 254 may include, for example, AP events and/or UE events. In some examples, the network events are classified as positive network events (otherwise referred to herein as "successful network events" or "successful events"), neutral network events, and/or negative network events (otherwise referred to herein as "failure network events" or "failure events"). The network events may include, for example, memory status, reboot events, crash events, Ethernet port status, upgrade failure events, firmware upgrade events, configuration changes, authentication events, DNS events, DHCP events, one or more types of roaming events, one or more types of proximity events, client authentication events (e.g., success and/or failures), etc., as well as a time and date stamp for each event. Log controller 255 determines a logging level for the device based on instructions from NMS 130. Data 254 may store any data used and/or generated by access point device 200, including data collected from UEs 148, such as successful events, failure events, and/or neutral events, that is transmitted by access point device 200 to NMS 130 for cloud-based management of wireless networks 106A by NMS 130.

Communications manager 242 includes program code that, when executed by processor(s) 206, allow access point 200 to communicate with UEs 148 and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and/or automatically managed or configured by NMS 130 to optimize wireless network performance on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

Figure 3:
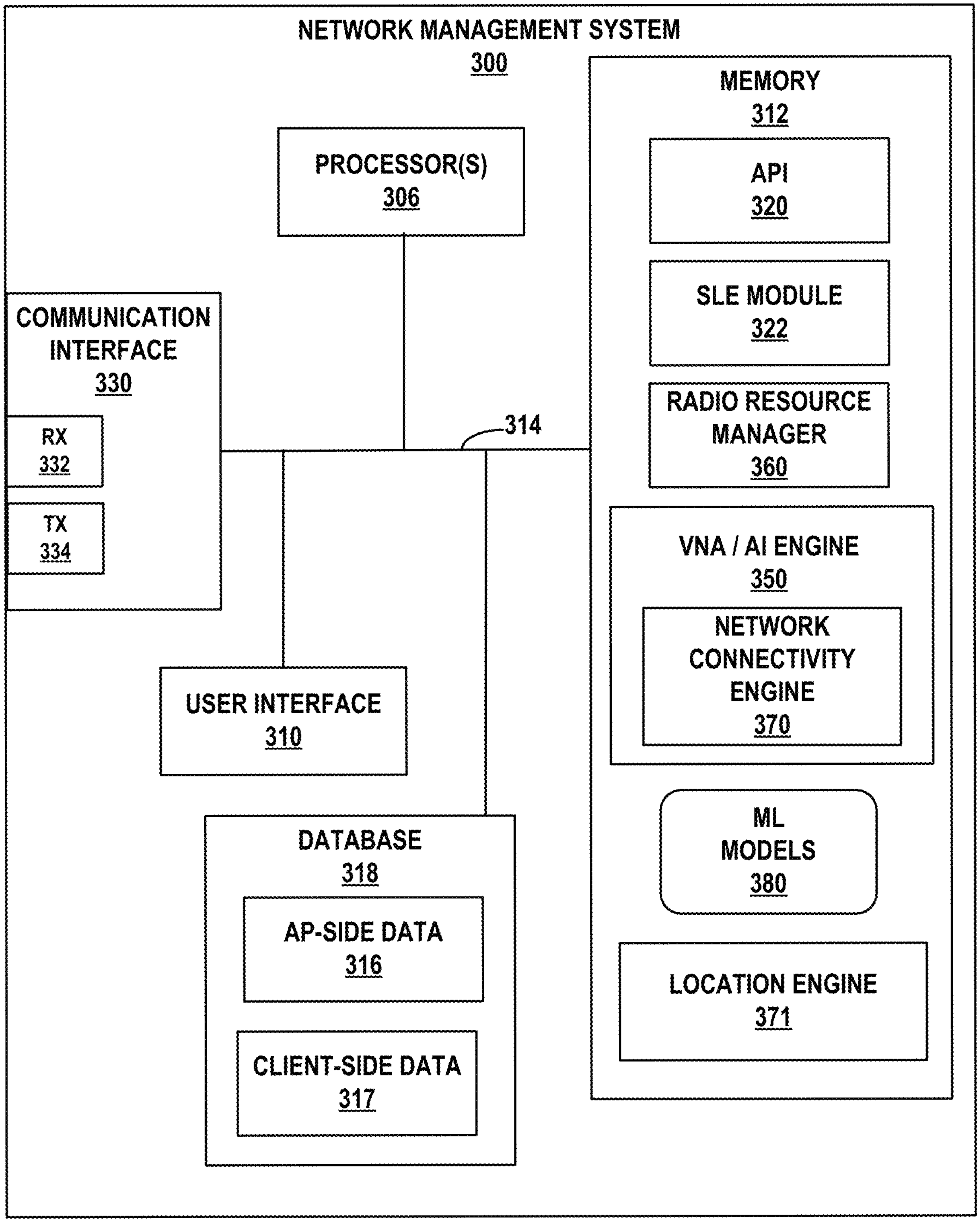
FIG. 3 is a block diagram of an example network management system configured to obtain and analyze client-side data about client devices and AP-side data about the client devices, in accordance with one or more techniques of the disclosure.

FIG. 3 is a block diagram of an example network management system configured to obtain and analyze client-side data about client devices and AP-side data about the client devices, in accordance with one or more techniques of the disclosure. In the example of FIG. 3, NMS 300 may be used to implement, for example, NMS 130 in FIG. 1A. In such examples, NMS 300 is responsible for monitoring and management of one or more wireless networks 106A-106N at sites 102A-102N, respectively. In some examples, NMS 300 receives network data collected by AP devices 142 from UEs 148, such as network data used to generate one or more events (e.g., successful events and/or failure events), and analyzes this data for cloud-based management of wireless networks 106A-106N. In some examples, NMS 300 may be part of another server shown in FIG. 1A or a part of any other server.

NMS 300 includes a communications interface 330, one or more processor(s) 306, a user interface 310, a memory 320, and a database 312. The various elements are coupled together via a bus 314 over which the various elements may exchange data and information.

Processor(s) 306 execute software instructions, such as those used to define a software or computer program, stored to a computer-readable storage medium (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks.

Communications interface 330 includes a receiver 332 and a transmitter 334 by which NMS 300 receives/transmits data and information to/from any of AP devices 142, UEs 148, servers 110, 116, 122, 128 and/or any other devices or systems forming part of network 100 such as shown in FIG. 1A. The data and information received by NMS 300 may include, for example, network data and/or event log data received from UEs 148 and AP devices 142 used by NMS 300 to remotely monitor and/or control the performance of wireless networks 106A-106N. For example, the network data and/or event log data may be as described in U.S. application Ser. No. 17/652,787, entitled "SUCCESSFUL CONNECTS METRICS FOR MONITORING AND CONTROL OF WIRELESS OR WIRED NETWORK," filed Feb. 28, 2022, the entire contents of which are incorporated by reference herein. Database 318 of NMS 300 may store the network data and/or event log data received from UEs 148 and AP devices 142. NMS may further transmit data via communications interface 330 to any of network devices such as AP devices 142 at any of network sites 102A-102N to remotely manage wireless networks 106A-106N.

Network connectivity engine 370 receives client-side data, including client device properties, from an NMS client agent executing on the client device (UE 148). As one example, network connectivity engine 370 receives a device identifier of the client device from the NMS client agent, such as a universal unique identifier (UUID) of the client device. network connectivity engine 370 can use the device identifier to correlate the client-side data for a particular client device of the plurality of client devices with a device identifier of the particular client device, and associate, based on the device identifier, the client-side data for the particular client device and the AP-side data for the particular client device.

For example, network connectivity engine 370 receives the client-side telemetry data for the particular client device, and determines an identifier for the particular client device from a particular AP device to which the particular client device is connected. The following is an example of UUID and client-side data used by network connectivity engine 370 to perform a cloud-based lookup of a client MAC address using AP-side data:

UUID 8cb6b0f8-cafa-4a2f-9785-9e34c4e170f4, from Redis cache, performing (re)lookup due to new SSID or SSID change for client, to better handle random MACs
ES client lookup result count of 1 for past hour, attempting to filter by these attributes: {hostname=Galaxy-XCover-Pro, org__id=9777c1a0-6ef6-11e6-8bbf-02e208b2d34f, ip=192.168.2.109, site__id=978c48e6-6ef6-11e6-8bbf-02e208b2d34f, ap=d420b080ef60}

In this example, the bolded items are information network connectivity engine 370 uses to correlate location, client properties, and AP information.

After looking up the client MAC address, network connectivity engine 370 obtains the client MAC address that corresponds to a UUID, identifies a set of AP-side data that is also associated with the same client MAC address, and analyzes the client-side data with respect to (or in addition to) the corresponding AP-side data to detect wireless issues. The wireless issues may include, for example, connectivity issues, roaming issues, voice issues, and others.

In some examples, network connectivity engine 370 is configured to associate client-side telemetry data for the particular client device with client-side location data for the particular client device based on an identifier assigned to a location application running on the particular client device.

An NMS client agent of a UE device sends client-side data including device information to NMS 130 via its connected AP. For example, the UE sends information about not only the AP that the UE connected with, but also information about other APs that UE recognized and did not connect with, and their signal strengths. NMS 300 receives the client-side data from the AP, where the client-side data includes the information about other APs the UE 400 recognized besides the AP sending the client-side data to NMS 300.

Network connectivity engine 370 analyzes the client-side data, e.g., with respect to the associated AP-side data for the particular client device, to detect a wireless issue, and in some examples outputs a notification including an indication of the wireless issue. In addition to the rich visibility of the device's Wi-Fi experience, an administrator can now understand how the client device interacts with the Wi-Fi environment.

In some examples, network connectivity engine 370 analyzes client-side data 317 independently from any analysis of AP-side data 316, without specifically relating the client-side data with any AP-side data. In some examples, network connectivity engine 370 analyzes only client-side data 317, and AP-side data 316 may not be analyzed or displayed.

Memory 320 includes one or more devices configured to store programming modules and/or data associated with operation of NMS 300. For example, memory 320 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, SLE module 322, a radio resource management (RRM) engine 360, a virtual network assistant (VNA)/AI engine 350, and a machine learning model 380. NMS 300 may also include any other programmed modules, software engines and/or interfaces configured for remote monitoring and management of wireless networks 106A-106N, including remote monitoring and management of any of AP devices 142.

RRM engine 360 monitors one or more metrics for each site 106A-106N in order to learn and optimize the radio-frequency (RF) environment at each site. For example, RRM engine 360 may monitor the coverage and capacity SLE metrics (e.g., managed by SLE module 322) for a wireless network 106 at a site 102 to identify potential issues with coverage and/or capacity in the wireless network 106 and to make adjustments to the radio settings of the access points at each site to address the identified issues. RRM engine 360 may determine channel and transmit power distribution across all AP devices 142 in each network 106A-106N. RRM engine 360 may monitor events, power, channel, bandwidth, and number of clients connected to each AP device. RRM engine 360 may further automatically change or update configurations of one or more AP devices 142 at a site 106 with an aim to improve the coverage and/or capacity SLE metrics and thus to provide an improved wireless experience for the user.

VNA/AI engine 350 analyzes network data received from AP devices 142 as well as its own data to monitor performance of wireless networks 106A-106N. For example, VNA engine 350 may identify when anomalous or abnormal states are encountered in one of wireless networks 106A-106N. In accordance with the techniques described in this disclosure, VNA/AI engine 350 may include a network scope failure detection engine 370 to detect network scope failures and/or identify the root cause of any anomalous or abnormal states. Network connectivity engine 370 may represent an example implementation of network connectivity engine 135 of FIG. 1A. In some examples, the network connectivity engine 370 utilizes artificial intelligence-based techniques and/or machine learning (ML) model 380 to help detect network connectivity issues by evaluating network connectivity events with respect to AP-side data 316 and client-side data 317. Additionally, or alternatively, network connectivity engine 370 utilizes artificial intelligence-based techniques and/or machine learning models 380 to identify whether a particular AP or client device is the root cause of the connectivity issue.

VNA/AI engine 350 may, in some examples, construct, train, apply and retrain supervised and/or unsupervised ML model 380 to event data (e.g., network data 316) to determine whether the collected network event data represents anomalous behavior that needs to be further analyzed by VNA/AI engine 350 to facilitate identification and resolution of faults. VNA/AI engine 350 may then apply the ML model 380 to data streams and/or logs of newly collected data of various network event types (e.g., statistics and data extracted from messages, counters, or the like) to detect whether the currently observed network event data with the stream of incoming data is indicative of a normal operation of the system or whether the incoming network event data is indicative of a non-typical system behavior event or trend corresponding to a malfunctioning network that requires mitigation.

When the application of the ML model 380 to newly collected data indicates that mitigation is required, VNA/AI engine 350 may identify a root cause of the anomalous system behavior and, if possible, trigger automated or semi-automated corrective action. In this way, VNA/AI engine 350 may construct and apply a ML model 380 based on a particular complex network to determine whether to perform further, resource-intensive analysis on incoming streams of path data collected (e.g., in real-time) from network devices within the complex network system.

In addition, VNA/AI engine 350 may automatically invoke one or more remedial actions intended to address the identified root cause(s) of a wireless or connectivity issue. Examples of remedial actions that may be automatically invoked by VNA/AI engine 350 may include, but are not limited to, invoking RRM 360 to reboot one or more AP devices and/or adjust/modify the transmit power of a specific radio in a specific AP device, adding service set identifier (SSID) configuration to a specific AP device, changing channels on an AP device or a set of AP devices, etc. The remedial actions may further include restarting a switch and/or a router, invoke downloading of new software to an AP device, switch, or router, etc. In some examples, the remedial actions may also include restarting a server. These remedial actions are given for example purposes only, and the disclosure is not limited in this respect. If automatic remedial actions are not available or do not adequately resolve the root cause, VNA/AI engine 350 may proactively and automatically provide a notification including recommended remedial actions to be taken by IT personnel to address the anomalous or abnormal wireless network operation.

In some examples, VNA/AI engine 350 generates one or more client-specific notifications, which may include recommendations for remedial actions, for a user of a client device. The notifications may be sent to the end-user of a client device via an email, a short message service (SMS) message, a telephone call, or other delivery form. In some examples, notifications and recommendations are only sent to the client device if the client device's end user opts in to receive them.

ML models 380 may comprise of different supervised ML models that are applied to AP-side data 316 and client-side data 317. For instance, network connectivity engine 370 may apply a first supervised ML model to AP-side data 316, additionally or alternatively, network scope failure detection engine 370 may apply a second supervised ML model to a second network scope in client-side data 317. Each of the supervised ML models may be configured with one or more parameters (e.g., model labels) to detect network connectivity issues. For example, an ML model for a particular network attribute may include model labels such as a "count of clients" threshold, "count of failure events" threshold, duration threshold, and/or roaming threshold. As described further below, network connectivity engine 370 may compare network event data from AP-side data 316 associated with one client device and compare network event data and/or client event data from client-side data 317 for the same client device. By applying ML models 380 to the AP-side data 316 and client-side data 317, network connectivity engine 370 may detect a wireless or network connectivity issue and/or identify the root cause of connectivity conditions.

Figure 4:
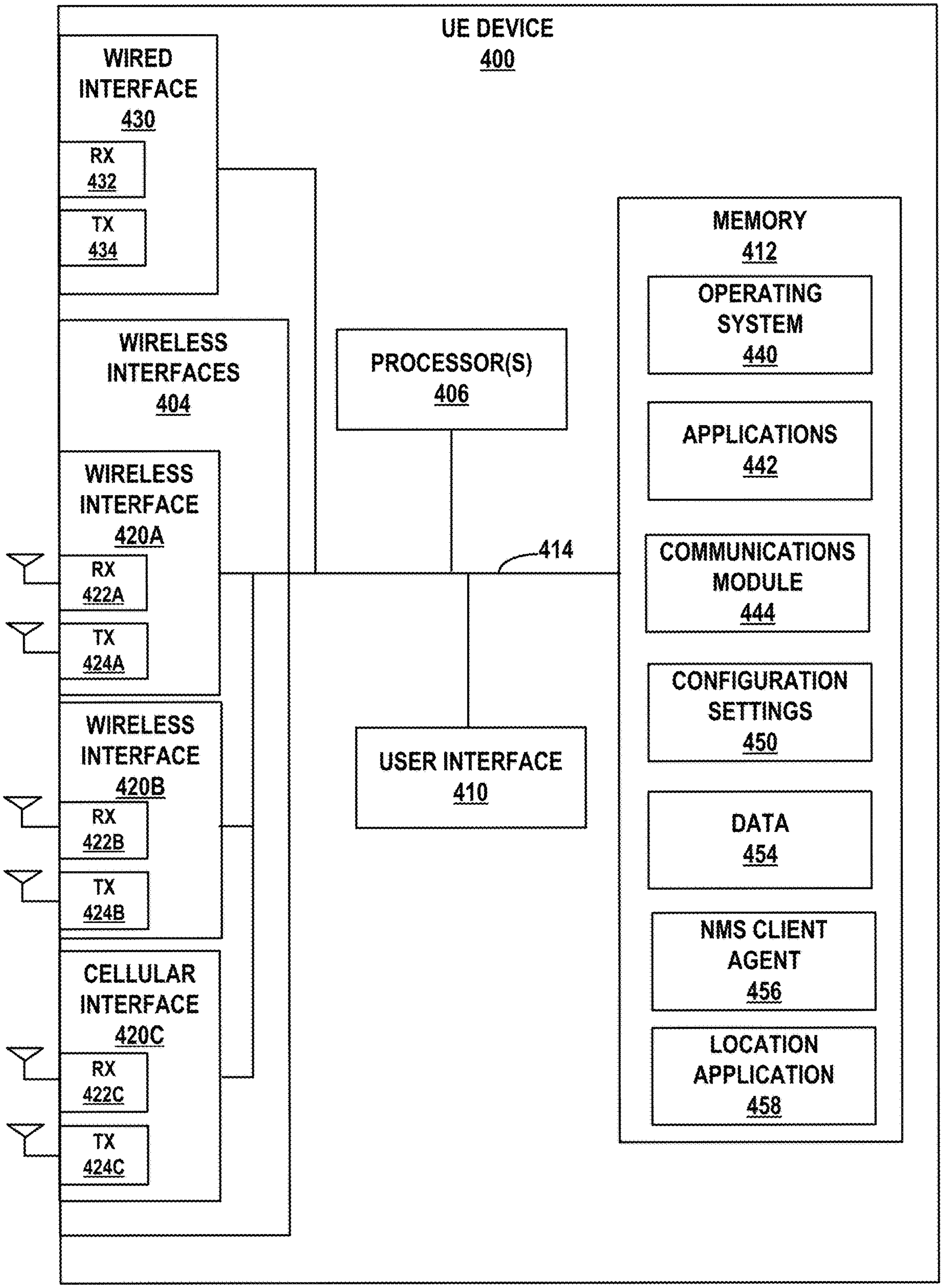
FIG. 4 is a block diagram of an example user equipment device in accordance with one or more techniques of the disclosure.

FIG. 4 shows an example user equipment (UE) device 400. Example UE device 400 shown in FIG. 4 may be used to implement any of UEs 148 as shown and described herein with respect to FIG. 1A. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring or any other type of mobile or wearable device. UE device 400 may also include any type of IoT client device such as a printer, a security sensor or device, an environmental sensor, or any other connected device configured to communicate over one or more wireless networks.

In accordance with one or more techniques of the disclosure, network data may be stored in UE memory 412 as network data 454 and transmitted to NMS 130/300 via one or more AP devices 142 in the wireless network. In some examples, NMS 130/300 receives data directly from UEs 148 not via AP devices 142. For example, NMS 130 receives network data from UEs 148 in networks 106A-106N of FIG. 1A. In some examples, NMS 130 receives relevant network data from UEs 148 on a continuous basis (e.g., every 2 seconds, 30 seconds, 40 seconds, or other appropriate time period), and NMS may determine the connection status of each UE device to the network. The network data 454 may include, for example, a log of one or more UE associated events or states (e.g., failure event, successful event, neutral event, etc.), and any other data or event relevant for determination of the connection status of the UE device.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple UE 400 to network(s) 134 of FIG. 1A. First, second and third wireless interfaces 420A, 420B, and 420C include receivers 422A, 422B, and 422C, respectively, each including a receive antenna via which UE device 400 may receive wireless signals from wireless communications devices, such as AP devices 142 of FIG. 1A, AP device 200 of FIG. 2, other UEs 148, or other devices configured for wireless communication. First, second, and third wireless interfaces 420A, 420B, and 420C further include transmitters 424A, 424B, and 424C, respectively, each including transmit antennas via which UE 400 may transmit wireless signals to wireless communications devices, such as AP devices 142 of FIG. 1A, AP device 200 of FIG. 2, other UEs 138 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE device 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform the techniques described herein.

In this example, memory 412 includes an operating system 440, applications 442, a communications module 444, configuration settings 450, and data storage for network data 454. Data storage for network data 454 may include, for example, a status/error log including network data specific to UE device 400. As described above, network data 454 may include any network data, events, and/or states that may be related to determination of one or more roaming quality assessments. The network data may include event data such as a log of normal events and error events according to a logging level based on instructions from the network management system (e.g., NMS 130/300). Data storage for network data 454 may store any data used and/or generated by UE 400, such as network data used to determine connection status of the UE device to the network, that is collected by UE device 400 and transmitted to any of AP devices 138 in a wireless network 106 for further transmission to NMS 130.

Communications module 444 includes program code that, when executed by processor(s) 406, enables UE 400 to communicate using any of wired interface(s) 430, wireless interfaces 420A-420B and/or cellular interface 450C. Configuration settings 450 include any device settings for UE 400 settings for each of wireless interface(s) 420A-420B and/or cellular interface 420C.

NMS client agent 456 is a software agent of NMS 130 that is installed on UE device 400 in some examples. In some examples, NMS client agent 456 can be implemented as a software application running on UE device 400. NMS client agent 456 is optional, in that it may not be needed in some example aspects of the techniques described herein. In examples in which UE device 400 includes NMS client agent 456, NMS client agent 456 collects information including detailed client-device properties from UE 400, including insight into UE device 400 roaming behaviors. The information provides insight into client roaming algorithms, because roaming is a client device decision. In some examples, NMS client agent 456 may display the client-device properties on UE device 400. NMS client agent 456 sends the client device properties to NMS 130, via an AP device to which UE device 400 is connected. NMS client agent 456 can be integrated into a custom application, or as part of location application 458, e.g., via mobile device management (MDM). NMS client agent 456 may be configured to recognize device connection types (e.g., cellular or Wi-Fi), along with the corresponding signal strength. For example, NMS client agent 456 recognizes access point connections and their corresponding signal strengths. NMS client agent 456 can store information specifying the APs recognized by UE device 400 as well as their corresponding signal strengths.

NMS client agent 456 or other element of UE device 400 also collects information about which APs the UE device 400 connected with, which also indicates which APs the UE device 400 did not connect with. NMS client agent 456 of UE 400 sends this information to NMS 130 via its connected AP. In this manner, UE device 400 sends information about not only the AP that UE device 400 connected with, but also information about other APs that UE device 400 recognized and did not connect with, and their signal strengths. The AP in turn forwards this information to the NMS, including the information about other APs the UE device 400 recognized besides itself. This additional level of granularity enables NMS 130, and ultimately network administrators, to better determine the Wi-Fi experience directly from the client device's perspective.

In some examples, NMS client agent 456 further enriches the client device data leveraged in service levels. For example, NMS client agent 456 may go beyond basic fingerprinting to provide supplemental details into properties such as device type, manufacturer, and different versions of operating systems. The NMS 130 may output for display, e.g., via a user interface, various client device details from a Client Reported view. Example pages output for display are shown in FIGS. 11-17. In the detailed client properties, the NMS 130 can display the Radio Hardware and Firmware information of UE device 400 received from NMS client agent 456. The more details the NMS client agent 456 can draw out, the better the VNA/AI engine gets at advanced device classification. The VNA/AI engine of the NMS 130 continually learns and becomes more accurate in its ability to distinguish between device-specific issues or broad device issues, such as specifically identifying that a particular OS version is affecting certain clients.

NMS client agent 456 enables NMS 130/300 to have a client-level view of the network, capturing events directly from UE device 400 and providing network visibility inside out, from the device's perspective. In addition to the rich visibility of the device's Wi-Fi experience, an administrator can now understand how the client device interacts with the Wi-Fi environment.

In some examples, NMS client agent 456 may cause user interface 410 to display a prompt that prompts an end user of the UE 400 to enable location permissions before NMS client agent 456 is able to report the device's location, client information, and network connection data to the NMS. NMS client agent 456 will then start reporting connection data to the NMS along with Location data from location application 458. In this manner, the end user of the client device can control whether the NMS client agent 456 is enabled to report client device information to the NMS.

In some examples, UE device 400 can execute a user-facing application operable to receive information from the NMS client agent 456 and present client-specific insights, recommendations, recommended actions, and other notifications to the end user of the UE device 400, e.g., via user interface 410. In some examples, the notifications may be provided to the end-user of a client device via an email, a SMS message, a telephone call, or other delivery form.

In some examples, NMS client agent 456 can be permitted to communicate with another application executing on UE device 400, such as a native application, that may present the insights, recommendations, or other notifications to the end user via a user interface associated with the native application. The end user of UE device 400 may enable this functionality by granting permission to the NMS client agent 456, and select certain information that can be shared with the NMS client agent 456, or may opt not to have certain information shared.

Figure 5:
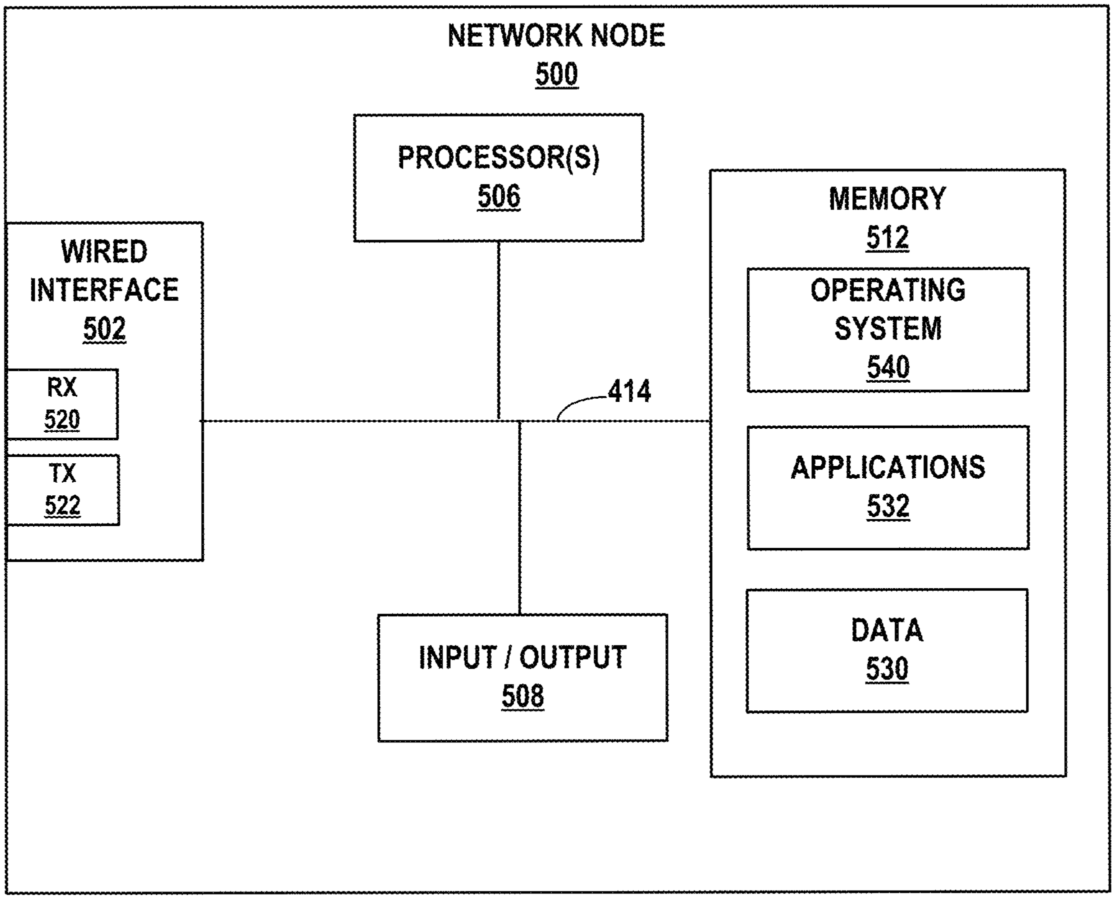
FIG. 5 is a block diagram of an example network node, such as a router or switch, in accordance with one or more techniques of the disclosure.

FIG. 5 is a block diagram illustrating an example network node 500 configured according to the techniques described herein. In one or more examples, the network node 500 implements a device or a server attached to the network 134 of FIG. 1A, e.g., router, switch, AAA server 110, DHCP server 116, DNS server 122, VNA 133, web server 128A-128X, etc., or a network device such as, e.g., routers, switches or the like.

In this example, network node 500 includes a communications interface 502, e.g., an Ethernet interface, a processor 506, input/output 508, e.g., display, buttons, keyboard, keypad, touch screen, mouse, etc., a memory 512 and an assembly of components 516, e.g., assembly of hardware module, e.g., assembly of circuits, coupled together via a bus 509 over which the various elements may interchange data and information. Communications interface 502 couples the network node 500 to a network, such as an enterprise network.

Though only one interface is shown by way of example, those skilled in the art should recognize that network nodes may have multiple communication interfaces. Communications interface 502 includes a receiver 520 via which the network node 500 can receive data and information (e.g., including operation related information such as registration request, AAA services, DHCP requests, Simple Notification Service (SNS) look-ups, and Web page requests). Communications interface 502 includes a transmitter 522, via which the network node 500 can send data and information (e.g., including configuration information, authentication information, web page data, etc.).

Memory 512 stores executable software applications 532, operating system 540 and data/information 530. Data 530 includes system log and/or error log that stores network data for node 500 and/or other devices, such as wireless access points, based on a logging level according to instructions from the network management system. Network node 500 may, in some examples, forward the network data to a network management system (e.g., NMS 130 of FIG. 1A) for analysis as described herein.

Figure 6:
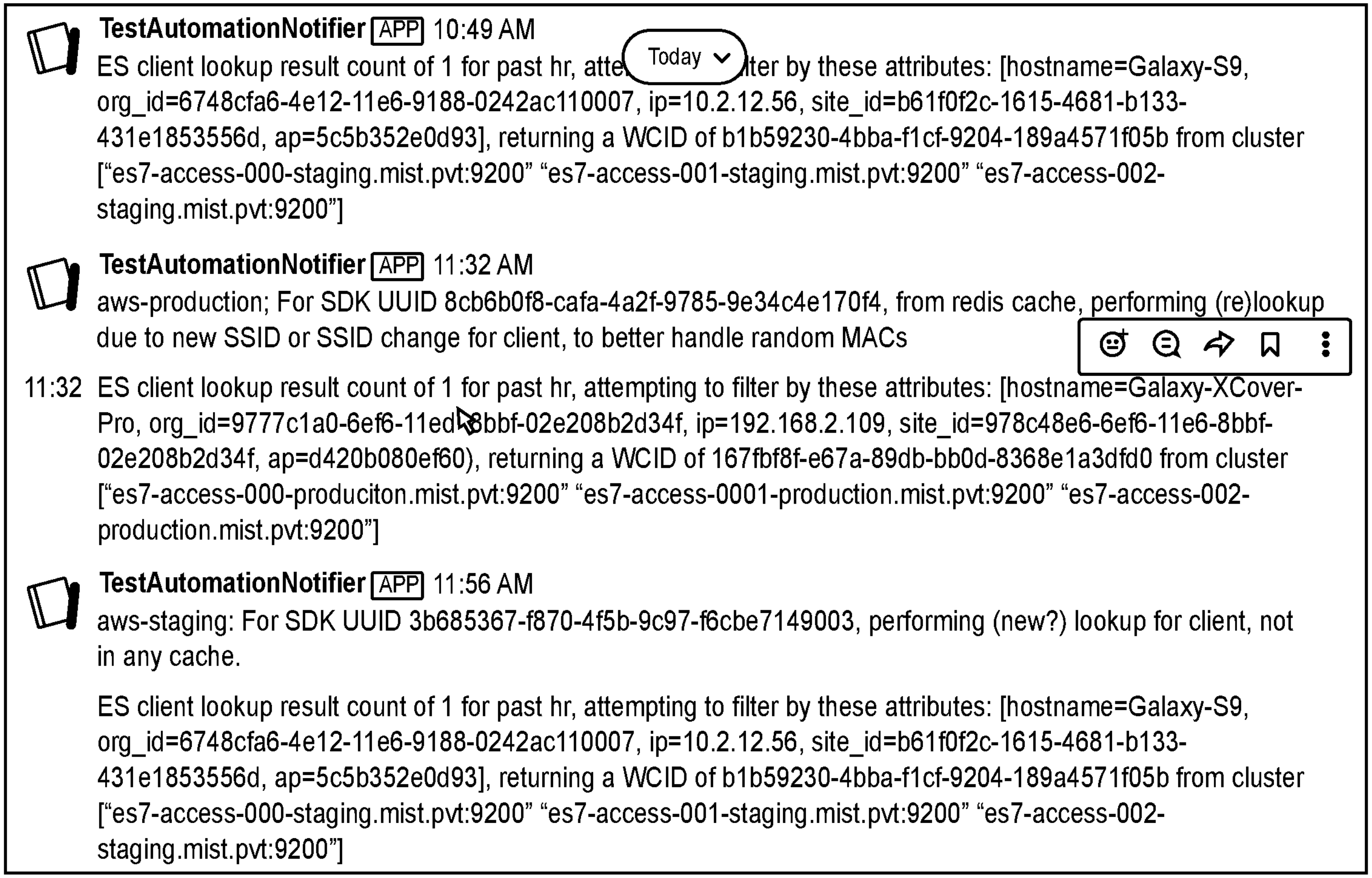
FIG. 6 is an example user interface showing example test automation notifier information that identifies an SDK UUID for a client device in accordance with one or more techniques of the disclosure.

FIG. 6 is an example user interface that can be output for display by NMS 130, showing example test automation notifier information that identifies an SDK UUID for a client device.

Figure 7A:
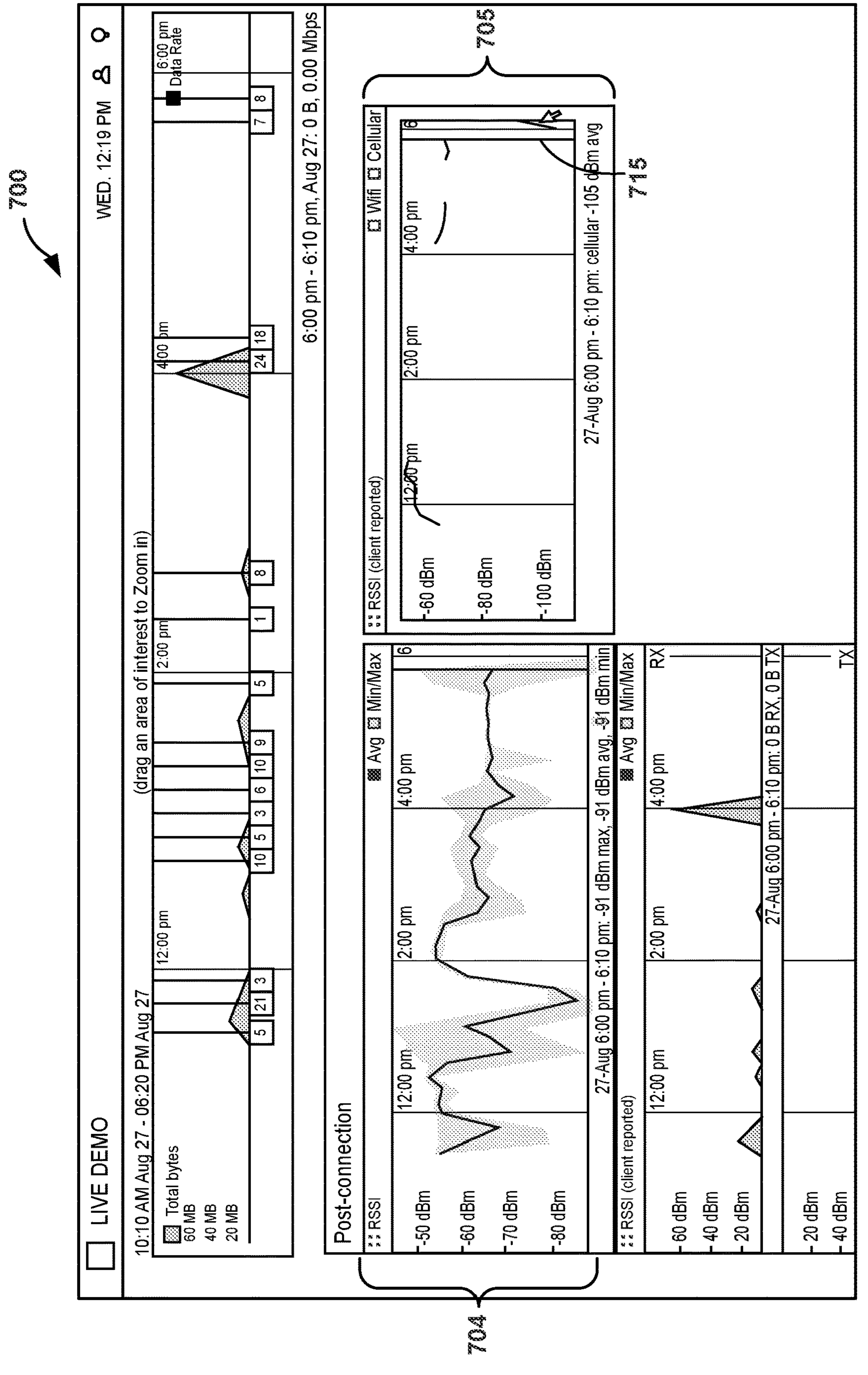
FIGS. 7A and 7B illustrate example user interfaces that display both AP-side data and client-side data for a time period in the same user interface in accordance with one or more techniques of the disclosure.
Figure 7B:
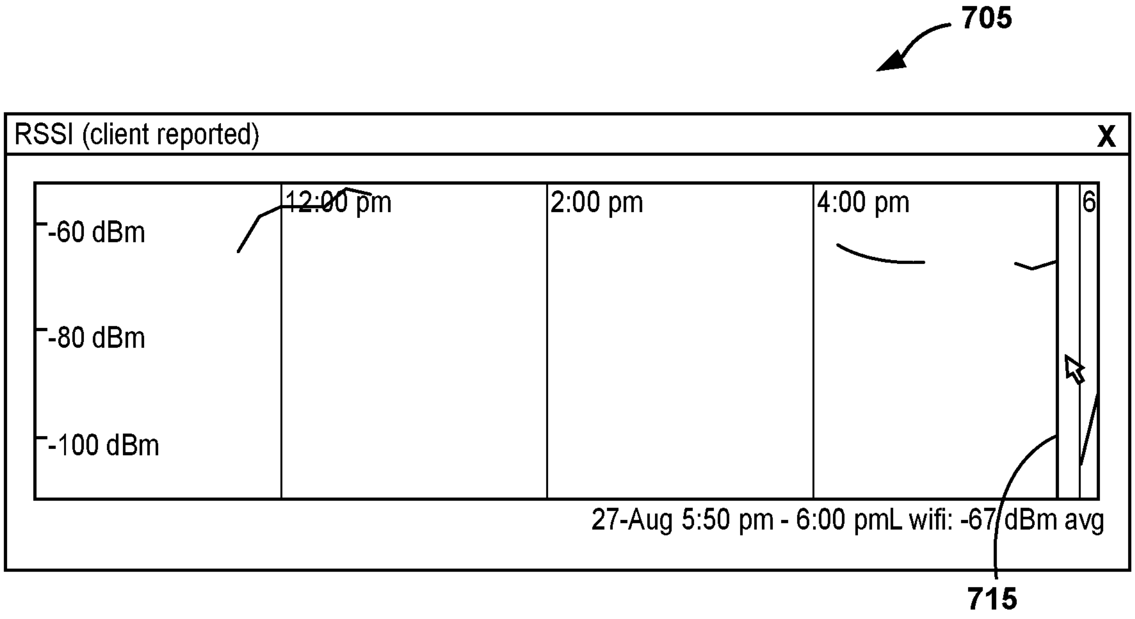

FIGS. 7A and 7B illustrate example user interfaces that display both AP-side data and client-side data for a time period in the same user interface that can be output for display by NMS 130. FIG. 7A is an example user interface 700 showing post-connection data including RSSI and client reported WiFi and cellular data. In a Post-Connection section of the user interface of FIG. 7A, the user interface displays information 704 about the AP connection with client, as well as client device-reported RSSI data in the trend chart 705. The client device-reported RSSI chart 705 provides data on how the client device experienced the access point signal during the selected time interval. This information can be helpful to troubleshoot Wi-Fi roaming and sticky client problems.

FIG. 7B is a detailed view of the client-reported data portion of the example user interface of FIG. 7A. A transition from WiFi to cellular data is shown at vertical line 715.

FIGS. 8-16 illustrate additional example user interfaces that can be output for display by NMS 130, in accordance with one or more techniques of the disclosure.

Figure 8:
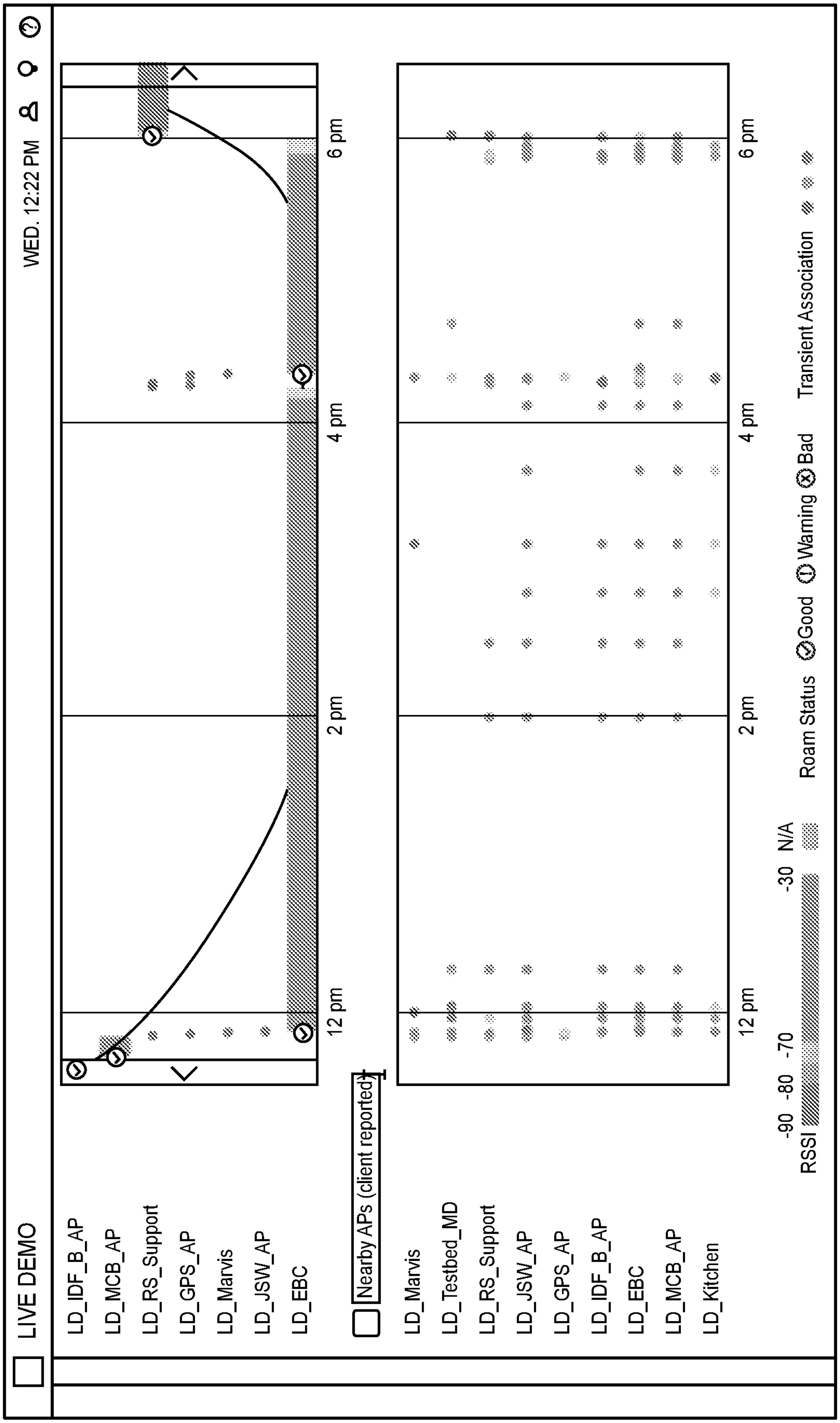
FIGS. 8-17 illustrate additional example user interfaces, in accordance with one or more techniques of the disclosure.

FIG. 8 is an example user interface that can be output for display by NMS 130, illustrating AP-side data and client-side data. The top graph shows AP-side data. The bottom graph indicates which APs (shown as circular icons) the client device reported as being nearby to itself, from which the client device made a roaming decision. From this indication, it can be determined whether the client device was aware of additional APs and whether the client device chose a correct AP. The bottom graph has an x-axis of time (e.g., in 2-hour increments) and the y-axis shows a list of AP names. At various time points, a circular icon has a different color depending on roam status (e.g., green for "Good," orange for "Warning," and red for "Bad.")

Figure 9:
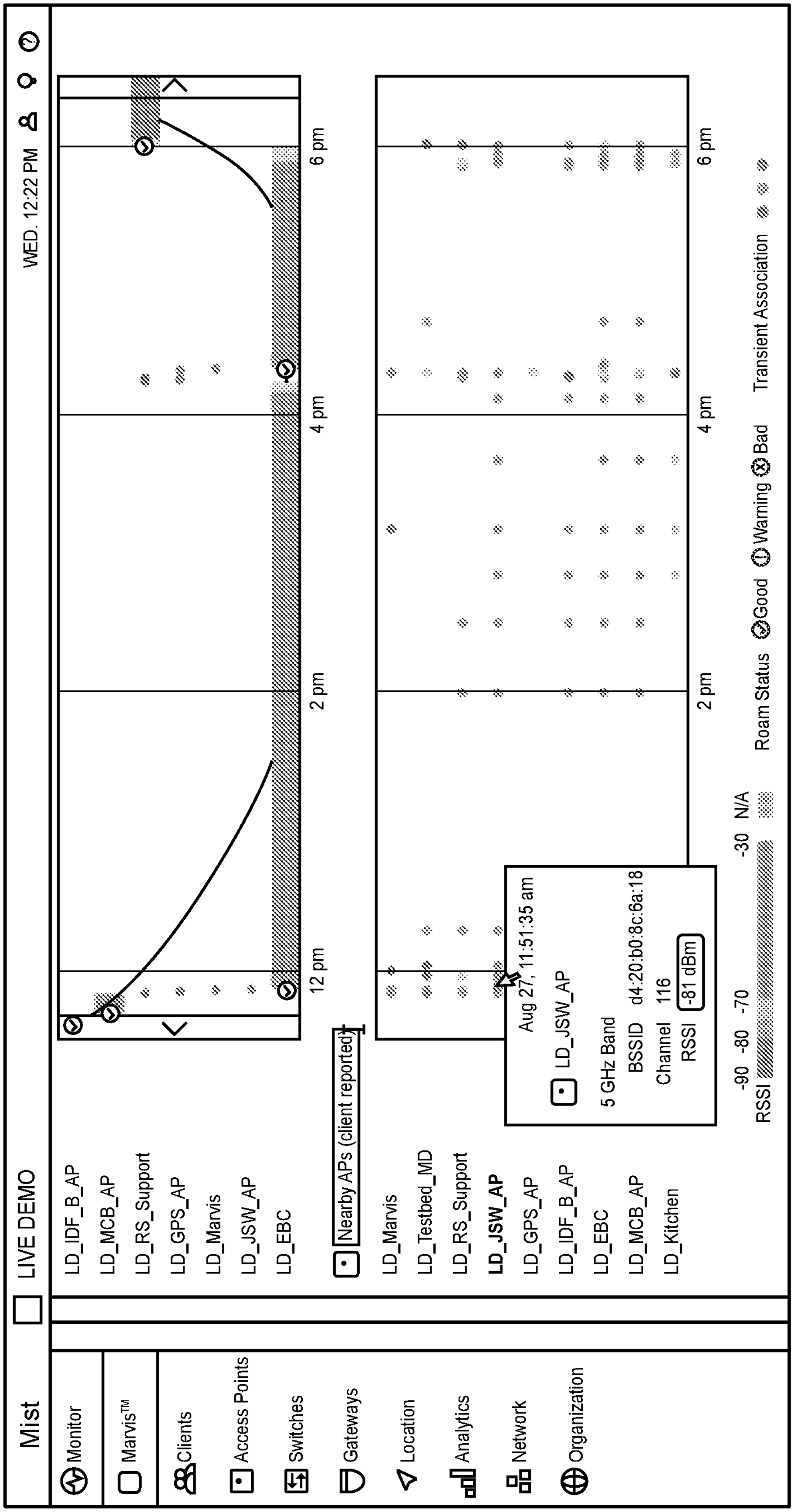

FIG. 9 is an example user interface that can be output for display by NMS 130, illustrating that hovering a mouse pointer over an AP icon causes the user interface to display information about the AP and signal strength of the AP.

Figure 10:
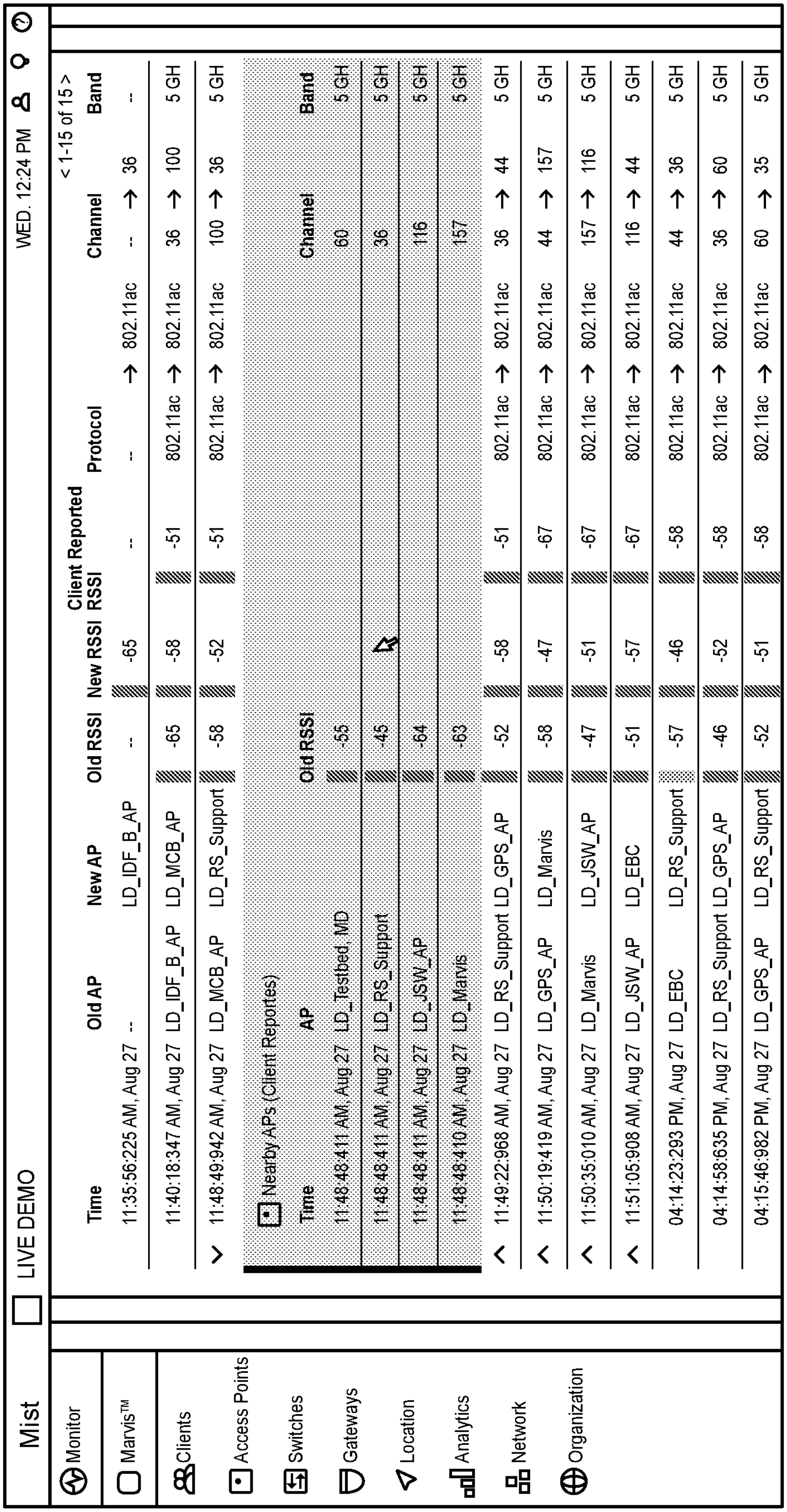

FIG. 10 is an example user interface that can be output for display by NMS 130, illustrating client-side data received by an NMS, including an alternative view of the client-device reported APs across time. The user interface of FIG. 10 shows a list view of the client-reported nearby APs, whereas the user interface of FIG. 8 is a graphical view.

Figure 11:
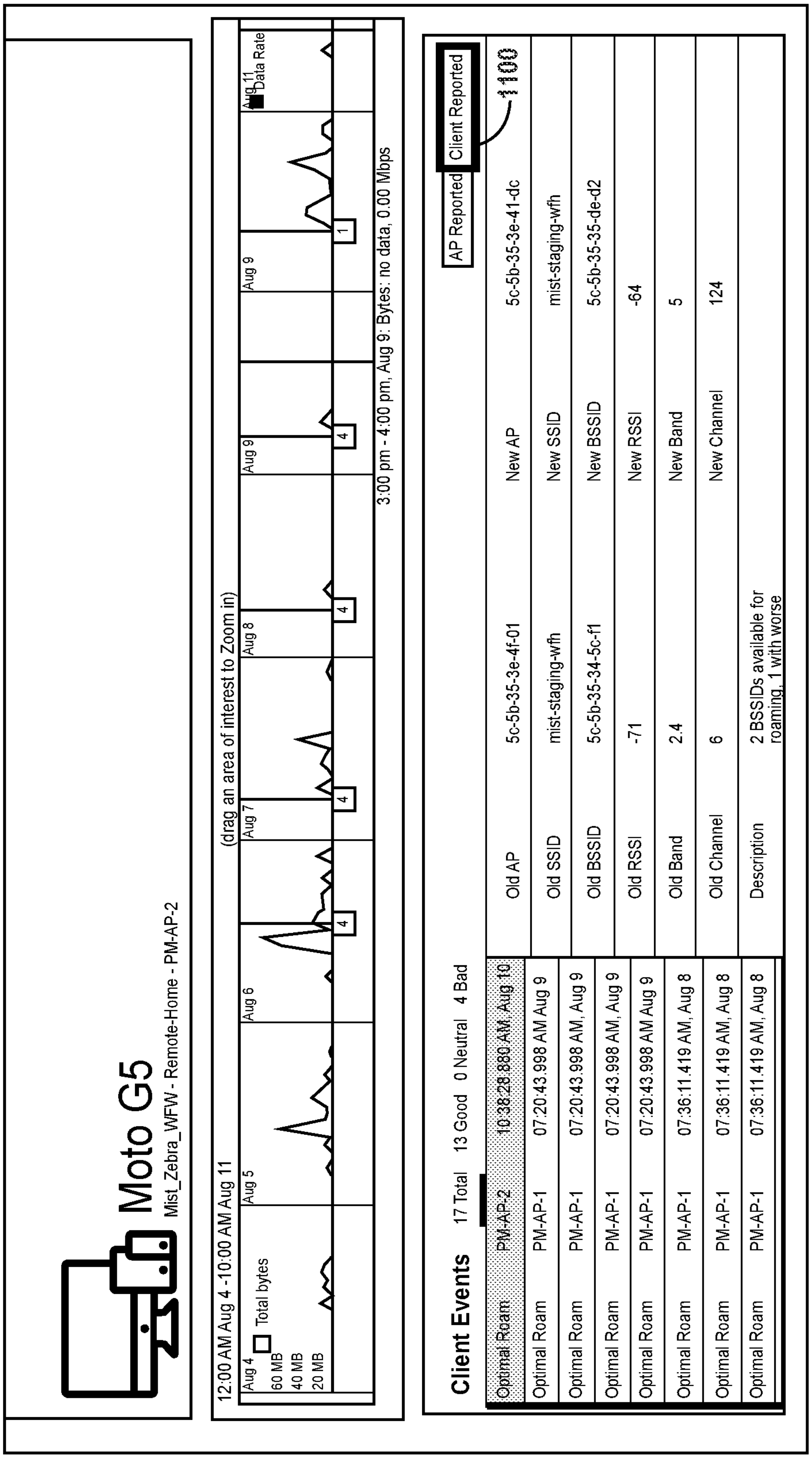

FIG. 11 is an example user interface that can be output for display by NMS 130, illustrating AI insights provided by NMS 130 based on AP-side data and client-side data, including using events reported by client devices to determine roaming quality metrics, such as optimal, suboptimal, or poor roam. To see these Client reported events, the user interface enables the user to select "Client Reported" tab 1100. The example of FIG. 11 shows several Optimal Roam readings. The user interface illustrates details of a selected AP, including client reported metrics of an Old AP and a New AP.

Figure 12:
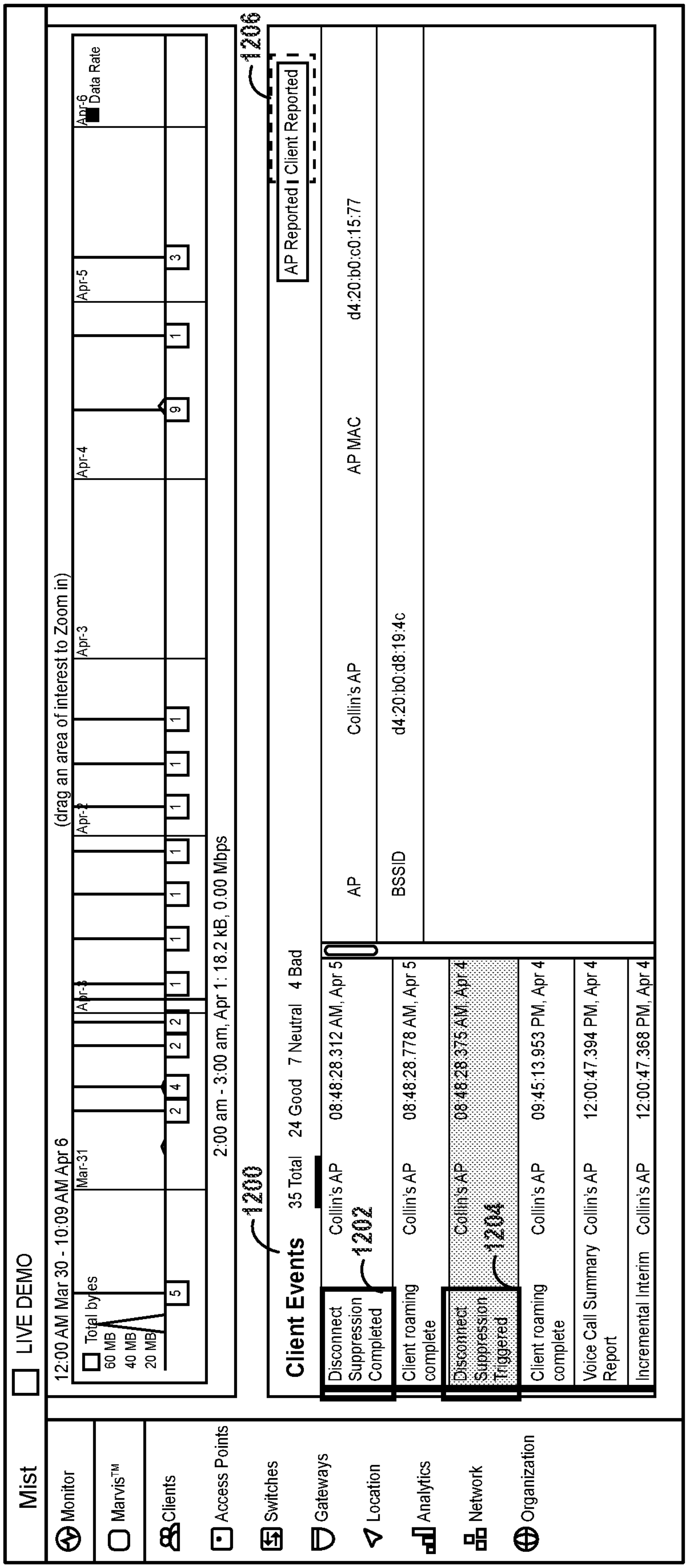

FIG. 12 is an example user interface that can be output for display by NMS 130, illustrating AI insights provided by NMS 130 based on client-side data, including using events reported by client devices. The events reported by client devices may be client events captured directly from the end user's device. This is an addition to AP reported event types captured from the AP side for client devices. With these new client-report events, a user has access to even more data to have a complete picture of client device activity on the site. To see these Client reported events, the user interface enables the user to select "Client Reported" tab 1206 and then toggle the tab under the Client Events section 1200 of the client device's Client Insights Dashboard. A user may switch between AP-reported and Client-reported events by clicking on the desired display. If the client device has no client events to report, this toggle will be hidden from the user interface display. Client events may include connection events, roaming events, voice events, for example.

In some examples, client events include connection events. APs may provide visibility into 150+ user pre-connection and post connection states, however, with the wireless insights described herein there is the capability to decipher what is happening when a client device tries to connect, roam and/or disconnects, or other connection events.

FIG. 12 illustrates a user interface that can be output for display by NMS 130, showing an indication of an example client event 1200 named "Disconnect Suppression Triggered." Later, a client event 1202 occurs, named "Disconnect Suppression Completed." Device management path is still active with the AP, however, the data path is blocked i.e., the client device neither sends nor receives data from the AP. During this period, the client device tries to roam to a new AP or reconnect to the same AP. On successful roam/reconnection to the AP, the data path/connection resumes (indicated by the Disconnect Suppression Completed event). Disconnect Reason (not shown in FIG. 12): Due to Wi-Fi disabled, profile updated from UI, profile deleted from UI.

Figure 13:
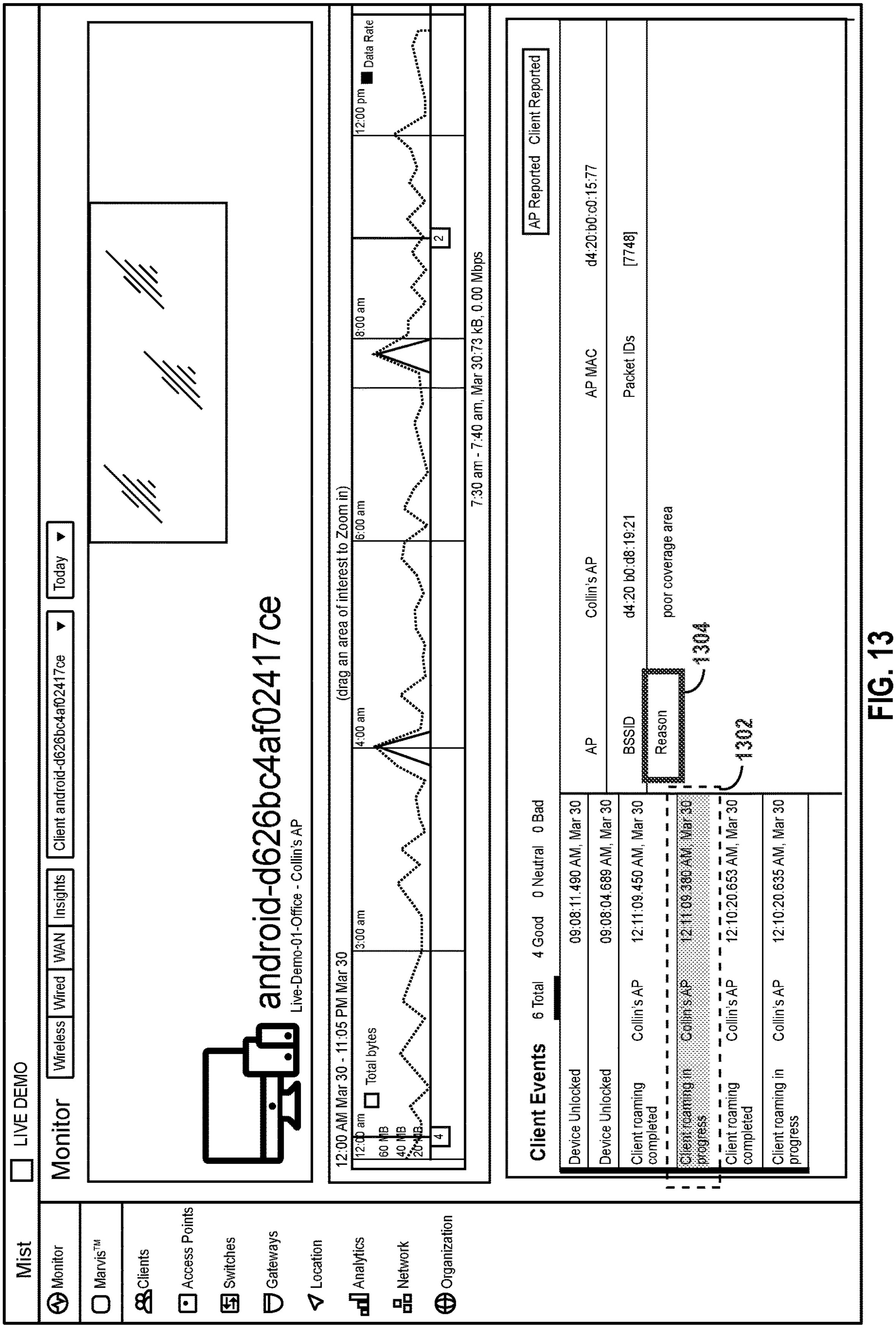

FIG. 13 is an example user interface illustrating client device insights related to roaming events, provided by NMS 130. The user interface can be output for display by NMS 130. In some examples, client events include roaming events. The NMS provides the roaming journey of every device with the 'RoamingOf' query, however, with client device wireless insights there is now the capability to get insights into what triggered the roam. For example, a roam may have been triggered by a poor coverage area. In the example of FIG. 13, in the "Client Reported" tab the user interface displays a highlighted client event 1302 of "Client roaming in progress," and provides a reason for this client event, displaying a Reason 1304 of "poor coverage area."

Figure 14:
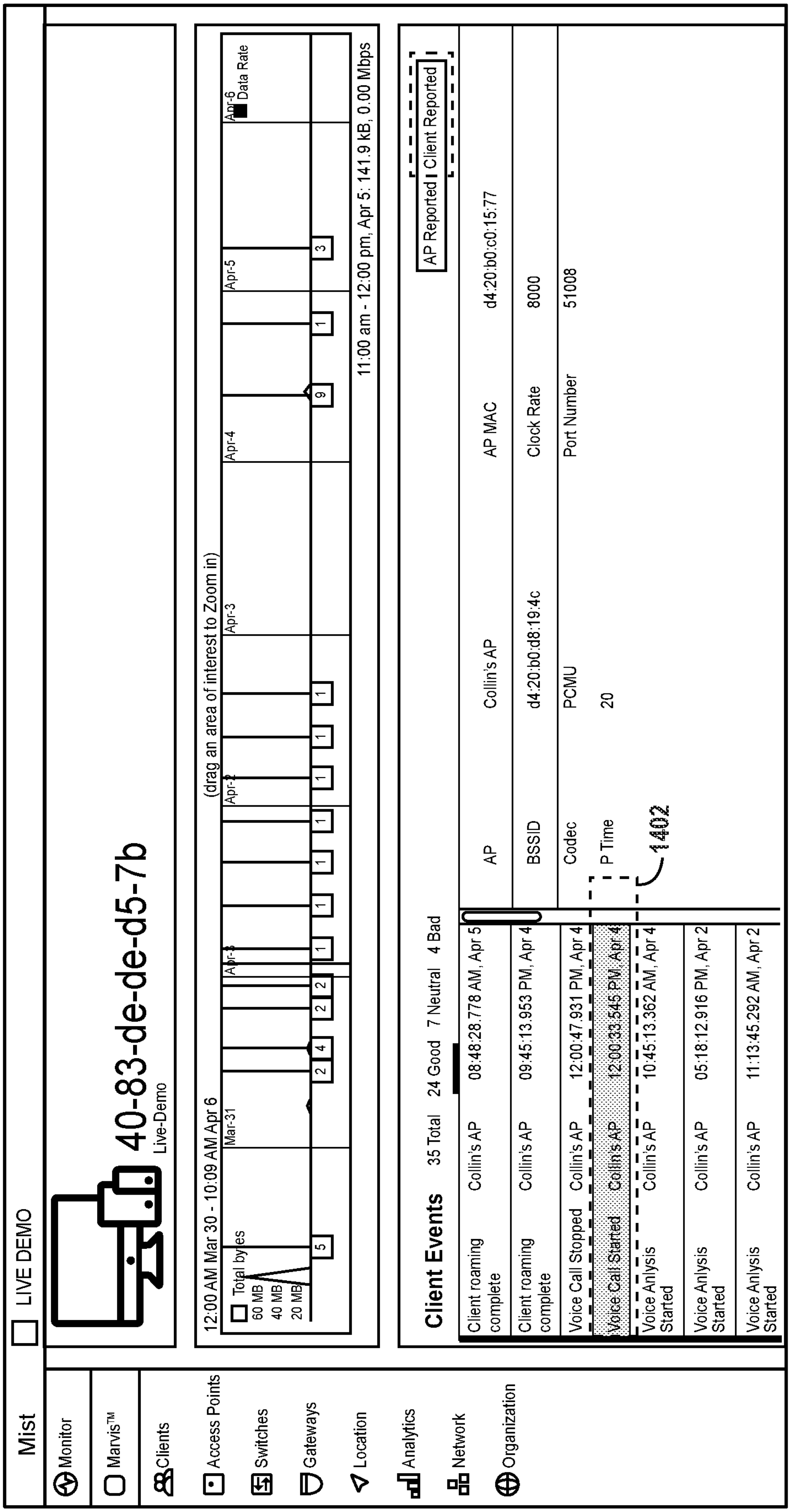
Figure 15:
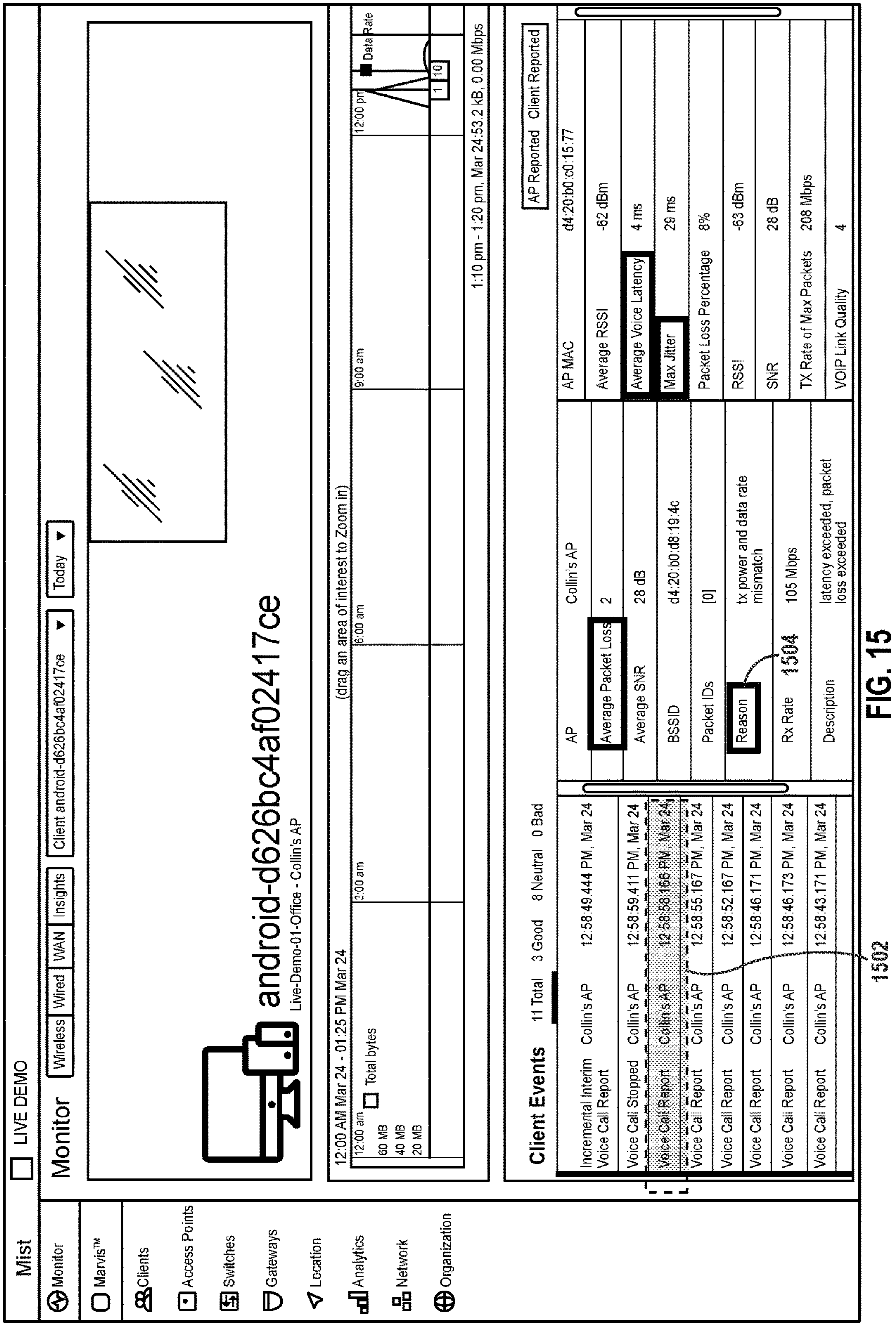
Figure 16:
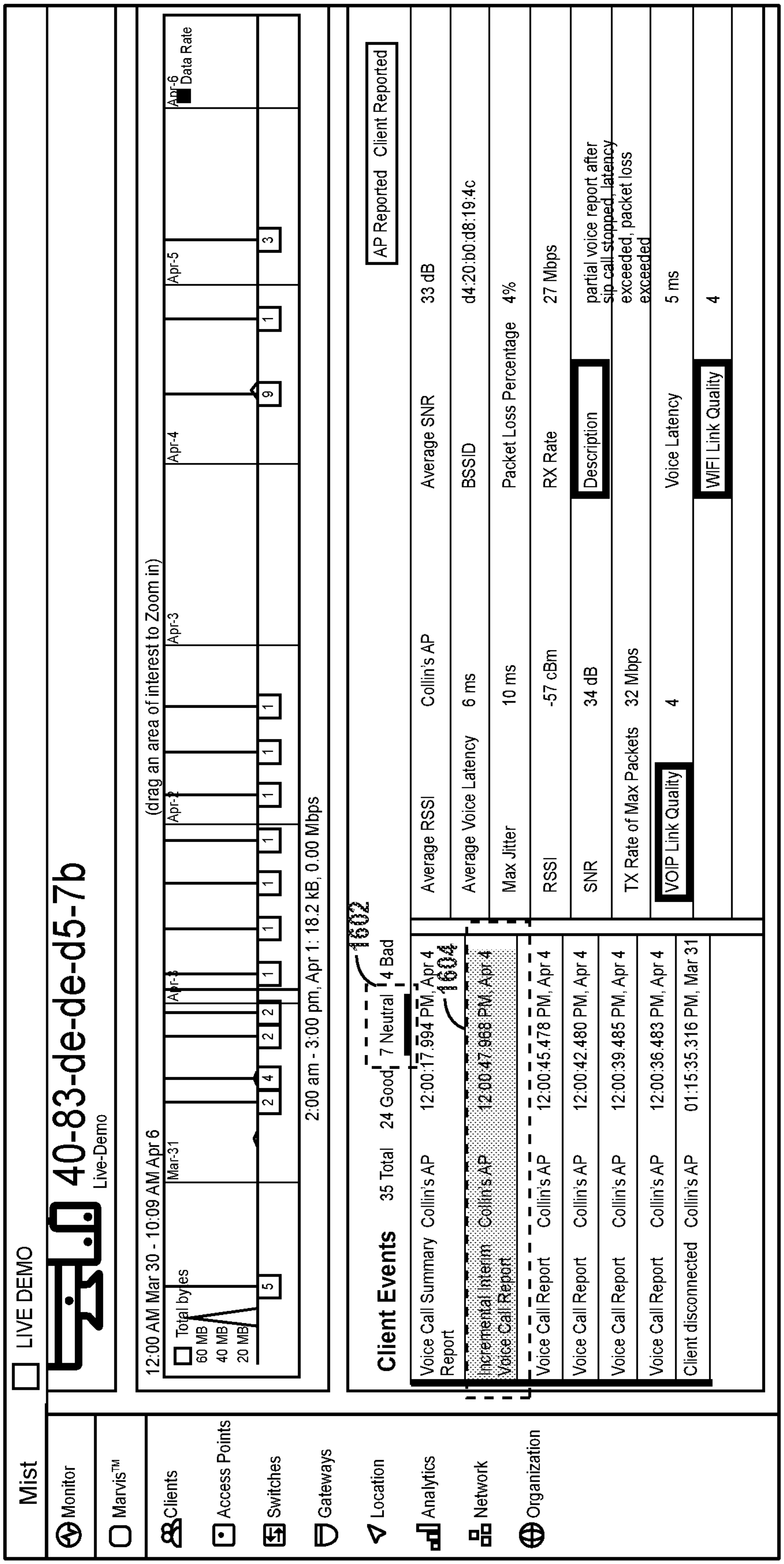

FIGS. 14-16 are example user interfaces that can be output for display by NMS 130, illustrating client device insights related to voice events. FIG. 14 is an example user interface illustrating metrics associated with a "Voice Call Started" client event 1402. For any voice call made using the client device, the user interface enables viewing not only when the call started and stopped, but also the performance of the voice call, both during the call as well at the end in the form of a summary. Other client events shown in FIG. 4 include Voice analysis started, voice call stopped, and client roaming completed.

In the example of FIG. 15, a Voice Call Report event 1502 is highlighted, and the performance of a voice call is measured and reported in terms of key voice metrics such as average packet loss, packet loss percentage, average voice latency, max jitter, Tx rate of Max Packets, Rx rate, voice over IP (VoIP) link quality (similar to mean opinion score (MOS)) and Wi-Fi link quality. Tx Rate represents a rate at which data packets being sent from a device. Rx Rate represents a rate at which data packets being received by the device. Additionally, the reason and description uniquely provide the voice call experience from the device's perspective based on the metrics. For example, the Reason field 1504 in the voice call report details summary of the Client Reported client events is displayed as "tx power and data rate mismatch." The description states "latency exceeded, packet loss exceeded."

On the Wi-Fi clients page, devices running the NMS client agent (application) show additional information such as device type and OS version. In the detailed client properties, the user interface displays the Radio Hardware and Firmware information.

The clients view page uniquely focuses on these client devices and presents them both in a historical fashion as well as currently seen (per site). Additionally, with respect to the above client device properties, the clients view page indicates the outliers i.e., client devices not conforming to the properties (e.g., radio firmware version) as seen with other similar client devices (same manufacturer, device type).

In the example of FIG. 16, a user interface output for display by NMS 130 shows a "Neutral" events tab 1602 selected from among Good, Bad, and Neutral. Seven neutral event types are listed. In the current view, metrics from one of the neutral events are shown in detail. Specifically, an Incremental Interim Voice Call Report event 1604 details are displayed in the Client Events view of Client Reported events. The event description is shown as "partial voice report after SIP call stopped, latency exceeded, packet loss exceeded."

Figure 17:
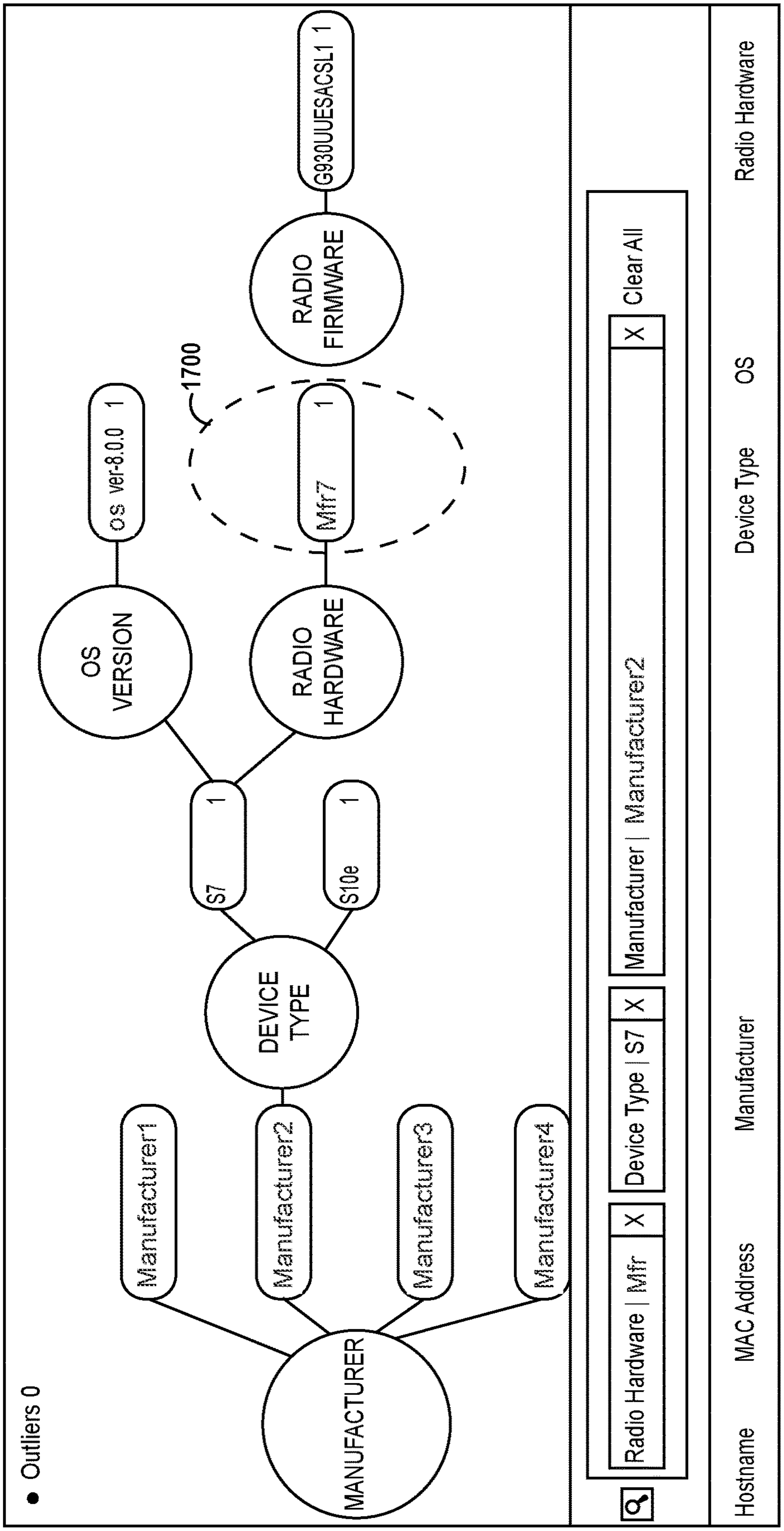

In some examples, the user interface may present a tree view. FIG. 17 illustrates an example user interface presenting a tree view that can be filtered based on client device properties. The tree visualization groups the client devices based on their properties. They are classified by manufacturer, device type, device OS (e.g., version number), radio hardware and firmware version. In some examples, a "Total Clients" tab (not shown) displays the total number of client devices for the selected time range and site. An "Outliers" tab (not shown) indicates a number of client devices that are not conforming to the normal values seen for the same manufacturer, device type.

In some examples, the selected client device property is highlighted in a different color, e.g., blue. In some examples, a path from the first property to the currently selected property is highlighted. In some examples, the user interface may present a list view. In a list view, the UI displays the client devices in a tabular format. By default, the list supports columns such as user, hostname, MAC address, manufacturer, device type, OS, radio hardware, and firmware. The user can filter this list by keywords. Previous and Next buttons are located in the top right corner of the list view to navigate between the different pages in the list view if the client count is greater than 50. The List view can be filtered upon clicking on any client property from the tree view. The client property is then selected, as shown in FIG. 17 as selected property 1700.

Figure 18:
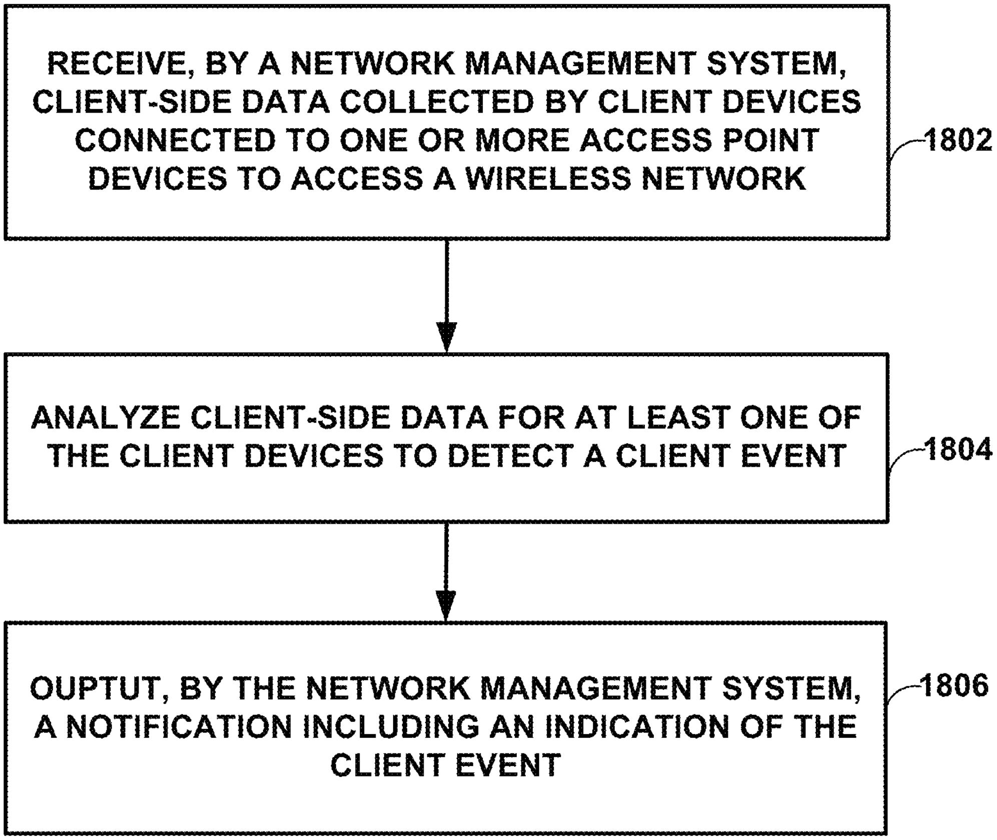
FIG. 18 is a flowchart illustrating example operation of a network management system in accordance with some aspects of this disclosure.

FIG. 18 is a flowchart illustrating example operation of a network management system in accordance with some aspects of this disclosure. The process of FIG. 18 will be described for purposes of example as being performed by NMS 130 of FIG. 1. NMS 130 receives client-side data collected by client devices connected to one or more access point devices to access a wireless network (1802). In some examples, some or all of the client-side data may be received by NMS 130 from an NMS client agent 456 running on a client device such as UE device 400 of FIG. 4. In some examples, some or all of the client-side data may be received by NMS 130 from a third-party application service. NMS 130 analyzes the client-side data for at least one of the client devices to detect a client event (1804). NMS 130 outputs a notification including an indication of the client event (1806). For example, NMS 130 may output the notification for display on a user interface. The notification may be any of the notifications indicating a client event depicted on the user interfaces of FIGS. 7A-17, for example.

Figure 19:
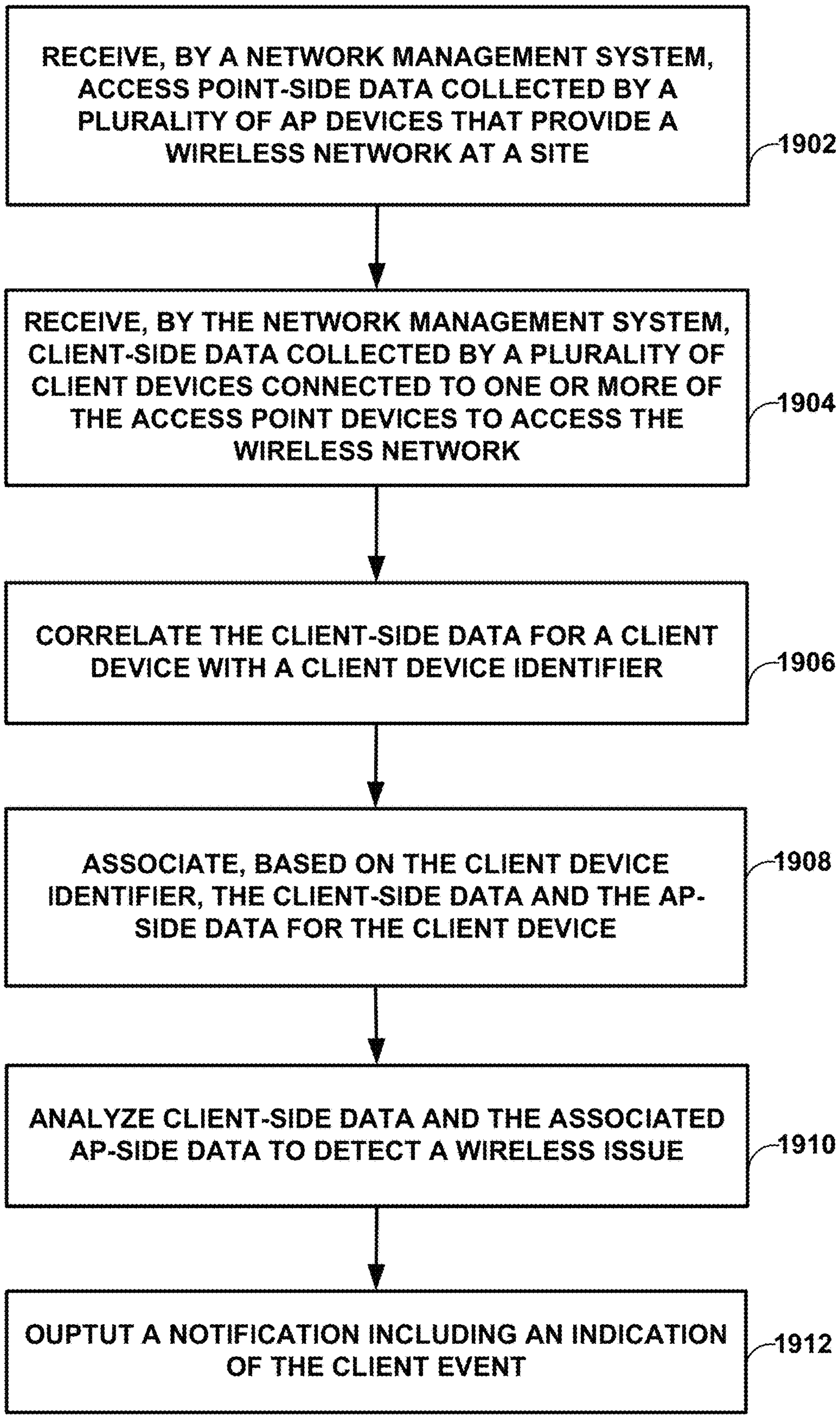
FIG. 19 is a flowchart illustrating another example operation of a network management system in accordance with some aspects of this disclosure.

FIG. 19 is a flowchart illustrating another example operation of a network management system in accordance with some aspects of this disclosure. The process of FIG. 19 will be described for purposes of example as being performed by NMS 130 of FIG. 1. NMS 130 receives AP-side data collected by multiple AP devices that provide a wireless network at a site (1902). NMS 130 also receives client-side data collected by a plurality of client devices connected to one or more of the plurality of AP devices to access a wireless network (1904). In some examples, some or all of the client-side data may be received by NMS 130 from an NMS client agent 456 running on a client device such as UE device 400 of FIG. 4. In some examples, some or all of the client-side data may be received by NMS 130 from a third-party application service.

NMS 130 correlates the client-side data for a particular client device of the plurality of client devices with a client device identifier of the particular client device (1906). In some examples, NMS 130 associates, based on the client device identifier, the client-side data and the AP-side data for the client device (1908). In some cases, this associating is optional. In some examples, the collected client-side data is filtered based on the client device identifier to identify client-side data that is specific to the particular client device. NMS 130 analyzes the client-side data and the AP-side data to detect a wireless issue (1910). The wireless issue may be a connectivity issue, in some examples. NMS 130 outputs a notification including an indication of the client event (1912).

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer readable medium, e.g., ROM, RAM, CDs, hard discs, etc., which include machine readable instructions for controlling a machine to implement one or more steps of a method.

The specific order or hierarchy of steps in the processes disclosed is an example of example approaches. Based upon design preferences, the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above-described methods or method steps can be implemented using machine executable instructions, such as software, included in a machine-readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all the steps of one or more methods of the one example aspect.

In some examples, the processor or processors, e.g., central processing unit (CPUs), of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g., one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, graphical processing unit (GPU), digital signal processing (DSP) unit, etc., configured to implement some or all the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth to provide a thorough understanding of some examples. However, some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11 ad ("IEEE P802.11 ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation (s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

Definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. The functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. In general, the systems, methods and techniques disclosed herein will work equally well for other types of communications environments, networks and/or protocols.

For purposes of explanation, numerous details are set forth to provide a thorough understanding of the present techniques. However, the present disclosure may be practiced in a variety of ways beyond the specific details set forth herein. Furthermore, while the examples illustrated herein show various components of the system collocated, the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, the components of the system can be combined into one or more devices, or split between devices, such as a transceiver, an access point, a station, a Domain Master, a network operation or management device, a node or collocated on a particular node of a distributed network, such as a communications network. For reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

This disclosure provides at least systems and methods for enhancing the ability to diagnose and remedy network issues. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A system comprising:

one or more processors; and one or more non-transitory computer-readable storage media comprising instructions executable by the one or more processors to cause the system to:

receive client-side data directly from each of a plurality of client devices that access the wireless network via one or more of the AP devices, wherein the client-side data comprises telemetry data collected by each of the plurality client devices;

for each client device of the plurality of client devices:

obtain correlate, based on an identifier for a location application executing on the client device, a device identifier of the client device from a particular AP device to which the client device is connected to correlate the client-side data with the device identifier of the client device;

identify, based on the correlation with the device identifier of the client device, AP-side data associated with the device identifier as AP-side data for the client device;

associate, based on the device identifier, the client-side data for the client device and the AP-side data for the client device;

analyze the client-side data and the AP-side data for the client device to detect a wireless issue; and output a notification including an indication of the wireless issue.

2. The system of claim 1, wherein the one or more non-transitory computer-readable storage media further comprise instructions executable by the one or more processors to associate the client-side data for the client device with client-side location data for the client device based on the identifier for the location application executing on the client device.

3. The system of claim 1, wherein the instructions executable by the one or more processors to analyze the client-side data and the AP-side data for the client device, comprise instructions executable to determine whether the wireless issue is due to a client device issue or a wireless network issue by determining whether the client device is connected to the wireless network at the site or connected to a cellular network.

4. The system of claim 1, wherein the instructions executable by the one or more processors to analyze the client-side data and the AP-side data for the client device, comprise instructions executable to: analyze aggregate correlated data for the plurality of client devices; and determine whether client devices of a same type or having a same software version are experiencing similar wireless issues.

5. The system of claim 1, wherein the instructions executable by the one or more processors to analyze the client-side data and the AP-side data for the client device, comprise instructions executable to: analyze aggregate correlated data for the plurality of client devices; and determine whether client devices within a similar location at the site are experiencing similar wireless issues.

6. The system of claim 1, wherein the device identifier of the client device comprises a Media Access Control (MAC) address of the client device, and wherein the identifier for the location application executing on the client device comprises a universal unique identifier (UUID) for the location application.

7. A method comprising:

receiving, by a network management system (NMS), access point (AP)-side data collected by a plurality of AP devices configured to provide a wireless network at a site;

receiving, by the NMS and directly from each of a plurality of client devices that access the wireless network via one or more of the AP devices, client-side data comprising telemetry data collected by each of the plurality of client devices, for each client device of the plurality of client devices:

obtaining, by the NMS and based on an identifier for a location application executing on the client device, a device identifier of the client device from a particular AP device to which the client device is connected to correlate the client-side data with the device identifier of the client device;

identifying, based on the correlation with the device identifier of the client device, AP-side data associated with the device identifier as AP-side data for the client device;

associating, based on the device identifier, the client-side data for the client device and the AP-side data for the client device, analyzing the client-side data and in-the AP-side data for the client device to detect a wireless issue;

and outputting, by the NMS, a notification including an indication of the wireless issue.

8. The method of claim 7, further comprising: associating the client-side data for the client device with client-side location data for the client device based on the identifier for the location application executing on the client device.

9. The method of claim 7, wherein analyzing the client-side data and the AP-side data for the client device comprises determining whether the wireless issue is due to a client device issue or a wireless network issue by determining whether the client device is connected to the wireless network at the site or connected to a cellular network.

10. The method of claim 7, wherein the client-side data further comprises an operating system version, a radio hardware version, and a firmware version on the client device, wherein analyzing the client-side data comprise: analyzing aggregate correlated data for the plurality of client devices; and determining whether client devices of a same type or having a same software version are experiencing similar wireless issues.

11. The method of claim 7, wherein analyzing the client-side data comprises: analyzing aggregate correlated data for the plurality of client devices; and determining whether client devices within a similar location at the site are experiencing similar wireless issues.

12. The method of claim 7, wherein receiving the client-side data comprises receiving the client-side data from a network management system agent executing on the client device.

13. The method of claim 7, further comprising receiving further client-side data for the client device from a third-party system separate from the client device.

14. The method of claim 7, wherein the wireless issue comprises a client event comprising one of a connection event, a roaming event, and a voice event.

15. The method of claim 7, wherein the identifier for the location application executing on the client device comprises a universal unique identifier (UUID) for the location application, and wherein the device identifier of the client device comprises a Media Access Control (MAC) address of the client device.

16. The method of claim 15, further comprising: obtaining, based on the UUID and network data of the client-side data, the MAC address of the client device, wherein the network data comprises at least one of: a device name of the client device, an Internet Protocol (IP) address of the client device, a site identifier to which the client device is connected, an identifier of an AP device to which the client device is connected, a Wi-Fi network name, or a combination thereof.

17. The method of claim 7, further comprising: outputting, for display and based on analyzing the client-side data and the AP-side data, a client-side data view.

18. A network management system comprising:

one or more processors;

and one or more non-transitory computer-readable storage media comprising instructions executable by the one or more processors to cause the network management system to:

receive client-side data directly from each of a plurality of client devices that access the wireless network via one or more of the AP devices, wherein the client-side data comprises telemetry data collected by each of the plurality client devices;

for each client device of the plurality of client devices:

obtain based on an identifier for a location application executing on the client device, the client-side data with a Media Access Control (MAC) address of the client device;

identify, based on the correlation with the MAC address of the client device, AP-side data associated with the MAC address as AP-side data for the client device;

associate, based on the MAC address, the client-side data for the client device and the AP-side data for the client device;

analyze the client-side data and the AP-side data for the client device to detect a wireless issue;

and output a notification including an indication of the wireless issue.

19. One or more non-transitory computer-readable storage media comprising instructions executable by one or more processors to cause a computing system to:

receive access point (AP)-side data collected by plurality of AP devices configured to provide a wireless network at a site;

receive, directly from each of a plurality of client devices that access the wireless network via one or more of the plurality of AP devices, client-side data comprising telemetry data collected by each of the plurality of client devices;

for each client device of the plurality of client devices:

obtain, based on an identifier for a location application executing on the client device, a device identifier of the client device from a particular AP device to which the client device is connected to correlate the client-side data with the device identifier of the client device;

identify, based on the correlation with the device identifier of the client device, AP-side data associated with the device identifier as AP-side data for the client device;

associate, based on the device identifier, the client-side data for the client device and the AP-side data for the client device;

analyze the client-side data and the AP-side data for the client device to detect a wireless issue;

and output a notification including an indication of the wireless issue.

* * * * *